US006993718B2

(12) United States Patent
Fujihara

(10) Patent No.: US 6,993,718 B2
(45) Date of Patent: Jan. 31, 2006

(54) INFORMATION PROCESSING METHOD AND APPARATUS

(75) Inventor: Masahiro Fujihara, Tokyo (JP)

(73) Assignee: Sony Corporation, Tokyo (JP)

( * ) Notice: Subject to any disclaimer, the term of this patent is extended or adjusted under 35 U.S.C. 154(b) by 672 days.

(21) Appl. No.: 10/225,852

(22) Filed: Aug. 22, 2002

(65) Prior Publication Data

US 2003/0056175 A1 Mar. 20, 2003

(30) Foreign Application Priority Data

Aug. 24, 2001 (JP) ............................. 2001-254933

(51) Int. Cl.
*G06F 15/00* (2006.01)
(52) U.S. Cl. .................. 715/530; 715/513; 340/995.1; 340/995.14; 340/995.19; 340/995.27; 701/201; 701/200; 701/202
(58) Field of Classification Search ................ 715/530
See application file for complete search history.

(56) References Cited

U.S. PATENT DOCUMENTS

| 5,930,474 | A | * | 7/1999 | Dunworth et al. ............. 707/10 |
| 6,138,072 | A | * | 10/2000 | Nagai .......................... 701/200 |
| 6,408,307 | B1 | * | 6/2002 | Semple et al. ........... 707/104.1 |
| 6,691,114 | B1 | * | 2/2004 | Nakamura .................... 707/10 |
| 6,701,307 | B2 | * | 3/2004 | Himmelstein et al. ......... 707/3 |
| 2001/0056443 | A1 | * | 12/2001 | Takayama et al. .......... 701/200 |
| 2004/0111669 | A1 | * | 6/2004 | Rossmann et al. .......... 715/513 |

FOREIGN PATENT DOCUMENTS

JP 2000337911 A * 12/2000
JP 2000339309 A * 12/2000

OTHER PUBLICATIONS http://www.maps.yahoo.com/, and it appeared on Feb. 2, 2002.*
http://www.mapquest.com/, as it appeared on Jun. 24, 2001.*
Beaulieu, Mark, Wireless Internet Applications and Architecture, Chapter 7—Developing Wireless Content, "Geocodes, Time Codes, and Personalized Data" (Addison Wesley Publishing, © Dec. 17, 2001).*
Austin, David, et al., Migrating to Oracle8i, Chapter 30—Application Development, "Oracle InterMedia" (Sams Publishing, © Oct. 21, 1999).*

* cited by examiner

Primary Examiner—Doug Hutton
(74) Attorney, Agent, or Firm—Frommer Lawrence & Haug LLP; William S. Frommer

(57) ABSTRACT

Such a system is provided in which a map can be supplied to a user to permit the user to grasp the geography easily, if the address or the telephone number of an installation of destination, such as a restaurant, is stated, even though the scheme of displaying a map picture is not stated by an information provider in a text document of a preset format. An HTML analyzer 211 initiates an analysis loop of an HTML document being browsed to extract a location information letter/character string, which is seemingly an address or a telephone number, from the HTML document. A location searcher 212 calculates the latitude/longitude of a site from the location information letter/character string received through controller 217, using a site information database 213, and sends the so calculated latitude/longitude through controller 217 to a map picture generating unit 214. The map picture generating unit 214 references the map information database 215 connected to it to generate a map picture of an area around the site of destination, e.g., a restaurant.

12 Claims, 15 Drawing Sheets

INFORMATION PROCESSING METHOD AND APPARATUS

BACKGROUND OF THE INVENTION

1. Field of the Invention

This invention relates to an information processing apparatus, an information processing method and to an information processing program, in which a text document of a preset form is demonstrated on a display screen in order to permit an operator to take out the desired information.

2. Background of the Invention

Conventionally, a personal computer, referred to below as a computer device, supervises the entire system based on an operating system (OS), such as Windows 98 (trademark), which is stored in an internal hard disc. The desired processing is carried out as an application software, referred to below as application, is booted through this OS.

A desired browser picture, for example, may be demonstrated by a computer device on a display by booting a WWW (World Wide Web) on the OS through an API (Application Program Interface) under control by a CPU of the computer device. From this browser picture, the site where there exist information resources, such as document or picture, present on the Internet, are specified by inputting a URL (Uniform Resource Locator) represented by a server's name, a port number, a folder name or by a file name. This causes the data, written in HTML (HyperText Markup Language), to be transferred from the information of the so specified Web server to the browser for demonstration on the display screen. The HTML is a description language for burying e.g., the position of pictures, speech, moving pictures or other documents in a document. If another linked URL is input to the display screen, the browser requests the information from another Web server so that the browser is again able to accept HTML data from the Web server.

For example, if a user specifies a restaurant's home page by inputting its URL, a menu or store data are demonstrated by a text document while photos of cooking are demonstrated by a picture, by HTML documents, on a display device of the computer.

Meanwhile, in order to demonstrate a map showing the site of e.g., an installation of destination in the aforementioned HTML document, definite commands for demonstrating a map need to be stated in the HTML document. Consequently, only a string of letters indicating the telephone numbers or addresses of the installation is stated in most of HTML documents, such that the user has to proceed to consult the map based on the so displayed information.

If desired to guide the user to the installation, a map of the surrounding area of the installation or a route map from a landmark such as a nearby station is routinely included in the HTML document. However, since this does not permit the user to grasp the route from the current position to the installation, the user has to search the route by other means.

SUMMARY OF THE INVENTION

It is an object of the present invention to provide an information processing apparatus, an information processing method, a program storage medium having stored therein an information processing program, which is based on the information processing method, and the information processing program, in which a map can be supplied to a user to permit the user to grasp the geography easily even though the scheme of displaying a map picture is not stated in the text document of a preset format by an information provider, as a producer of a text document of a preset format, but if the address or the telephone number of an installation of destination, such as a restaurant, is stated therein.

It is another object of the present invention to provide an information processing apparatus, an information processing method, a program storage medium having stored therein an information processing program which is based on the information processing method, and the information processing program, in which a route to an installation of destination can be output in dependence upon the current site of an individual user who may thus be guided in his or her movement to the installation of destination.

In one aspect, the present invention provides an information processing apparatus in which a text document of a preset form, arranged in a descriptive language, capable of burying at least the picture information in a document, is demonstrated on a display screen to permit a user to take out the desired information, in which the apparatus includes location information letter/character string extracting means for automatically extracting a location information letter/character string in the text document of the preset form as displayed on the display screen, site search means for searching a site indicated by the location information letter/character string extracted by the location information letter/character string extracting means for generating the latitude/longitude information of the site, map picture generating means for generating a map picture around the latitude/longitude information generated by the site search means, and text document correcting means for correcting the text document of the preset form for synthetically displaying the map picture generated by the map picture generating means in the text document of the preset form displayed on the display screen. The text document of the preset form as corrected by the text document correcting means is newly displayed on the display screen.

In another aspect, the present invention provides an information processing method in which a text document of a preset form, arranged in a descriptive language, capable of burying at least the picture information in a document, is displayed on a display screen to permit a user to take out the desired information, in which the method includes a location information letter/character string extracting step of automatically extracting a location information letter/character string in the text document of the preset form as displayed on the display screen, a site search step of searching a site indicated by the location information letter/character string extracted at the location information letter/character string extracting step for generating the latitude/longitude information of the site, a map picture generating step of generating a map picture around the latitude/longitude information generated at the site search step, a text document correcting step of correcting the text document of the preset form for synthetically displaying the map picture generated at the map picture generating step in the text document of the preset form displayed on the display screen and a step of newly displaying the text document of the preset form as corrected at the text document correcting step on the display screen.

In still another aspect, the present invention provides a program in which a text document of a preset form, arranged in a descriptive language, capable of burying at least the picture information in a document, is displayed on a display screen to permit a user to take out the desired information, in which the program includes a location information letter/character string extracting step of automatically extracting a location information letter/character string in the text document of the preset form as displayed on the display screen, a site search step of searching a site indicated by the location information letter/character string extracted at the location information letter/character string extracting step for generating the latitude/longitude information of the site, a map picture generating step of generating a map picture around the latitude/longitude information generated at the site search step, a text document correcting step of correcting the text document of the preset form for synthetically displaying the map picture generated at the map picture generating step in the text document of the preset form displayed on the display screen, and a step of newly displaying the text document of the preset form as corrected at the text document correcting step on the display screen.

In still another aspect, the present invention provides an information processing apparatus in which a text document of a preset form, arranged in a descriptive language, capable of burying at least the picture information in a document, is demonstrated on a display screen to permit a user to take out the desired information, in which the apparatus includes location information letter/character string extracting means for automatically extracting a location information letter/character string in the text document of the preset form as displayed on the display screen, site searching means for searching a site indicated by the location information letter/character string extracted by the location information letter/character string extracting means for generating the latitude/longitude information for the site, route searching means for searching a route reaching the latitude/longitude information of the site generated by the site searching means from a current site, map picture generating means for generating a map picture including the totality of routes output by the route searching means, and text document correcting means for correcting the text document of the preset form for synthetically displaying the map picture generated at the map picture generating step in the text document of the preset form displayed on the display screen. The text document of the preset form as corrected by the text document correcting means is newly displayed on the display screen.

In still another aspect, the present invention provides an information processing method in which a text document of a preset form, arranged in a descriptive language, capable of burying at least the picture information in a document, is demonstrated on a display screen to permit a user to take out the desired information, in which the method includes a location information letter/character string extracting step of automatically extracting a location information letter/character string in the text document of the preset form as displayed on the display screen, a site searching step of searching a site indicated by the location information letter/character string extracted by the location information letter/character string extracting step of generating the latitude/longitude information for the site, a route searching step of searching a route reaching the latitude/longitude information of the site generated by the site searching step from a current site, a map picture generating step of generating a map picture including the totality of routes output by the route searching step, and a text document correcting step of correcting the text document of the preset form for synthetically displaying the map picture generated at the map picture generating step in the text document of the preset form displayed on the display screen. The text document of the preset form as corrected by the text document correcting step is newly displayed on the display screen.

In yet another aspect, the present invention provides a program in which a text document of a preset form, arranged in a descriptive language, capable of burying at least the picture information in a document, is demonstrated on a screen to permit a user to take out the desired information, in which the method includes a location information letter/character string extracting step of automatically extracting a location information letter/character string in the text document of the preset form as displayed on the screen, a site searching step of searching a site indicated by the location information letter/character string extracted by the location information letter/character string extracting step of generating the latitude/longitude information for the site, a route searching step of searching a route reaching the latitude/longitude information of the site generated by the site searching step from a current site, a map picture generating step of generating a map picture including the totality of routes output by the route searching step, a text document correcting step of correcting the text document of the preset form for synthetically displaying the map picture generated at the map picture generating step in the text document of the preset form displayed on the screen, and a display step of newly displaying the text document of the preset form as corrected by the text document correcting step on the screen.

According to the present invention, a map can be furnished to the browsing party (user) to permit the user to grasp the geography easily even though the scheme of displaying a map picture is not stated by an information provider in a text document of a preset format but if the address or the telephone number of an installation of destination, such as a restaurant, is stated therein.

Moreover, according to the present invention, a route to an installation of destination can be output in dependence upon the current site of an individual user who may thus be guided in his or her movement to the installation of destination.

DESCRIPTION OF THE PREFERRED EMBODIMENTS

Figure 1:
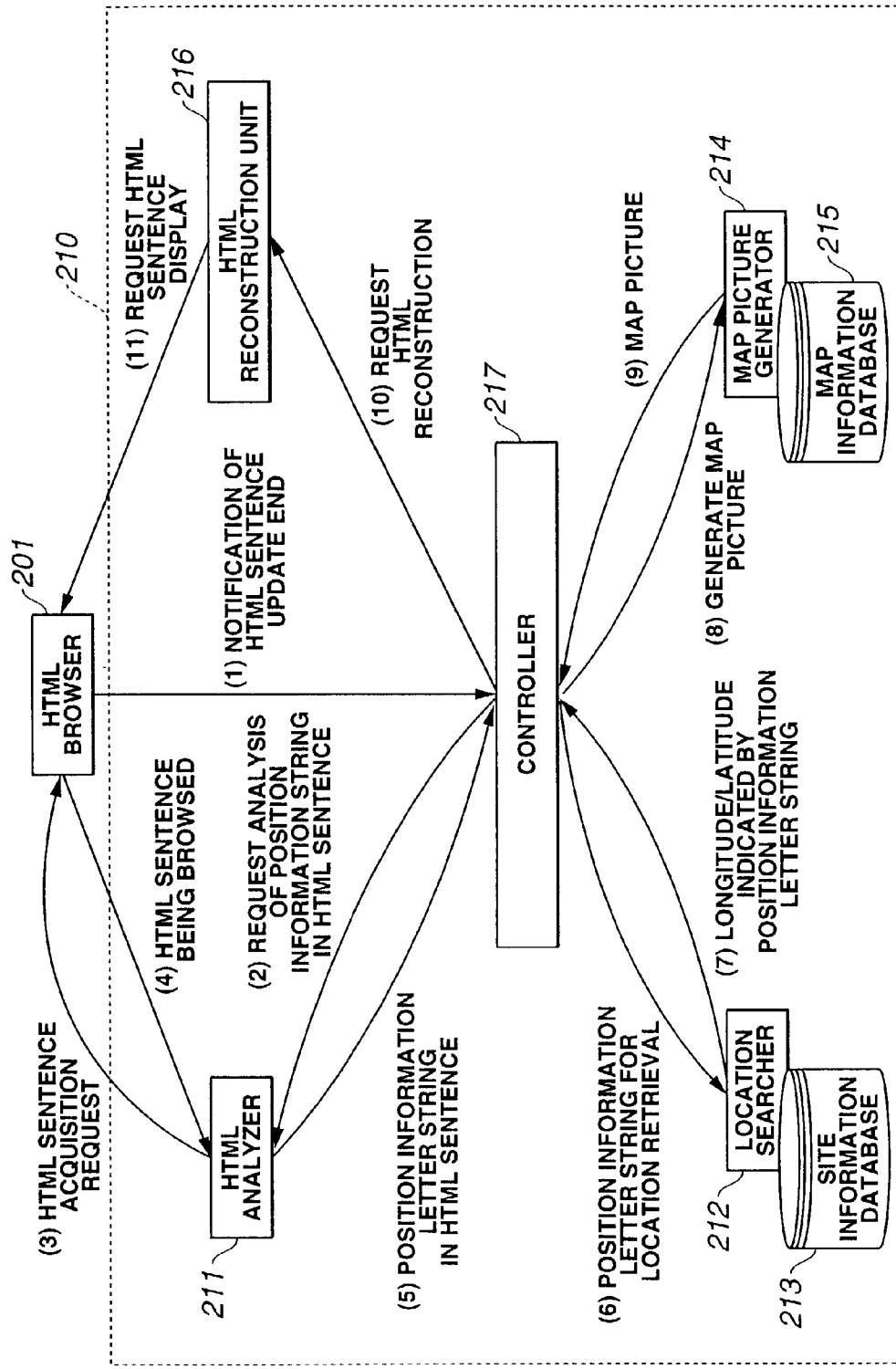
FIG. 1 is a block diagram showing the structure of an HTML information processing apparatus according to a first embodiment of the present invention.

Referring to the drawings, certain preferred embodiments of the present invention will be explained in detail.

A first embodiment of the present invention is now explained. This first embodiment is directed to an HTML (HyperText Markup Language) information processing apparatus in which, in order for an operator to take out the desired information over the Internet, the HTML document, described in the HTML, is demonstrated on a display screen, such as a liquid crystal display or a CRT.

FIG. 1 shows the structure of an HTML information processing apparatus 210 of this type. The HTML information processing apparatus 210 is made up by an HTML analyzer 211 for analyzing an HTML document, being browsed by an HTML browser 201, a location searcher 212 for searching a location representing the results of analysis carried out by the HTML analyzer 211, a map picture generating unit 214 for generating a map picture of the location searched by the location searcher 212, an HTML reconstruction unit 216 for reconstructing an HTML document for synthetic representation of a map picture generated by the map picture generating unit 214 in an HTML document demonstrated on the map picture, and a controller 217 for controlling the operation of various equipment. The location searcher 212 is connected to a site information database 213, while the map picture generating unit 214 is connected to a map information database 215.

The HTML browser 201 is a software for browsing HTML documents, and has a function of advising that the HTML document being browsed has been updated, and a function of outputting an HTML document being browsed.

The HTML analyzer 211 analyzes the HTML document, which has been acquired from the HTML browser 201 and which is being browsed, to extract a location information character string, representing the results of analysis, from the HTML document. This location information string of letters or characters is a string of letters or characters capable of specifying particular positions, such as addresses or telephone numbers, of an installation which is stated in the HTML document. Consequently, the HTML analyzer 211 is a specified instance of location information letter string extracting means for automatically extracting the location information string of letters or characters from the HTML document.

The location searcher 212 searches a location indicated by the location information letter string as extracted by the HTML analyzer 211 to generate the latitude longitude information of the site by having reference to the site information database 215.

The map picture generating unit 214 generates a map of the site indicated by the latitude longitude information, and a neighboring area, as generated by the location searcher 212, by having reference to the map information database 215.

The HTML reconstruction unit 216 performs corrections of synthetic representation of the map picture on the original HTML description language (codes) acquired from the HTML browser 201. That is, the HTML reconstruction unit 216 represents a specified instance of correction means for correcting the HTML document for synthetic representation of the map picture generated by the map picture generating unit 214 in the original HTML document demonstrated on the display picture.

The operation of this HTML information processing apparatus 210 is hereinafter explained.

First, the HTML information processing apparatus 210 boots the HTML browser 201 by the controller 217 to display a desired browser picture on the display picture unit. The user then specifies the site, where there exist information resources, such as documents or pictures, present on the Internet, from the HTML browser picture, by inputting the URL (Uniform Resource Locator) specified by the server's name, port number, folder name or by the filename. The controller 217 receives, from the so specified Web server information, the data written with the HTML description language (codes), to display the HTML document on the browser picture. For example, if the user specifies a home page of a restaurant by inputting its URL, the menu or the store data are displayed by the text document, while the photo of a cooking is displayed as a picture, on a display screen of the HTML information processing apparatus 210, by the HTML browser 201.

When e.g., a new page, such as the aforementioned restaurant's home page, by the HTML document, is opened, the HTML browser 201 sends the HTML document updating end notification to the controller 217 ((1) of FIG. 1). The controller 217 then requests the HTML analyzer 211 to analyze the location information string of letters or characters in the HTML document (2).

The HTML analyzer 211 is responsive to the request for analysis to request the HTML browser 201 to acquire the HTML document (3). When the HTML document being browsed is acquired from the HTML browser 201 (4), the HTML analyzer 211 analyzes the HTML document being browsed to extract the location information string of letters or characters contained therein. This extraction of the location information string of letters or characters by the HTML analyzer 211 may be accomplished by a technique disclosed in Japanese Laying-Open Patent Publication 2000-339309 entitled "String of letters or characters analysis methods and apparatus and a medium for supplying the method" by the present Assignee, as will be explained subsequently, or by the analytic method or technique employing pattern matching.

The "letter/character string analysis apparatus" of the Japanese Laying-Open Patent Publication 2000-339309 is such an apparatus including input means for converting the input information from outside into letter/character strings of a preset format, storage means for storing the string of letters or characters as converted by the input means, and a plurality of analyzing processing means for analyzing the letters or characters stored in the storage means, in a concerted fashion, and writing the intermediate results of analysis in the storage means, for co-owning and for unifying the intermediate results, in order to discriminate the sorts of the information represented by the letter/character strings, whereby, should there be no definite procedure, analysis may be made from a possible point of analysis to co-own and unify the intermediate results sequentially obtained to permit discrimination of the sorts of the information represented by the letter/character strings.

Figure 2:
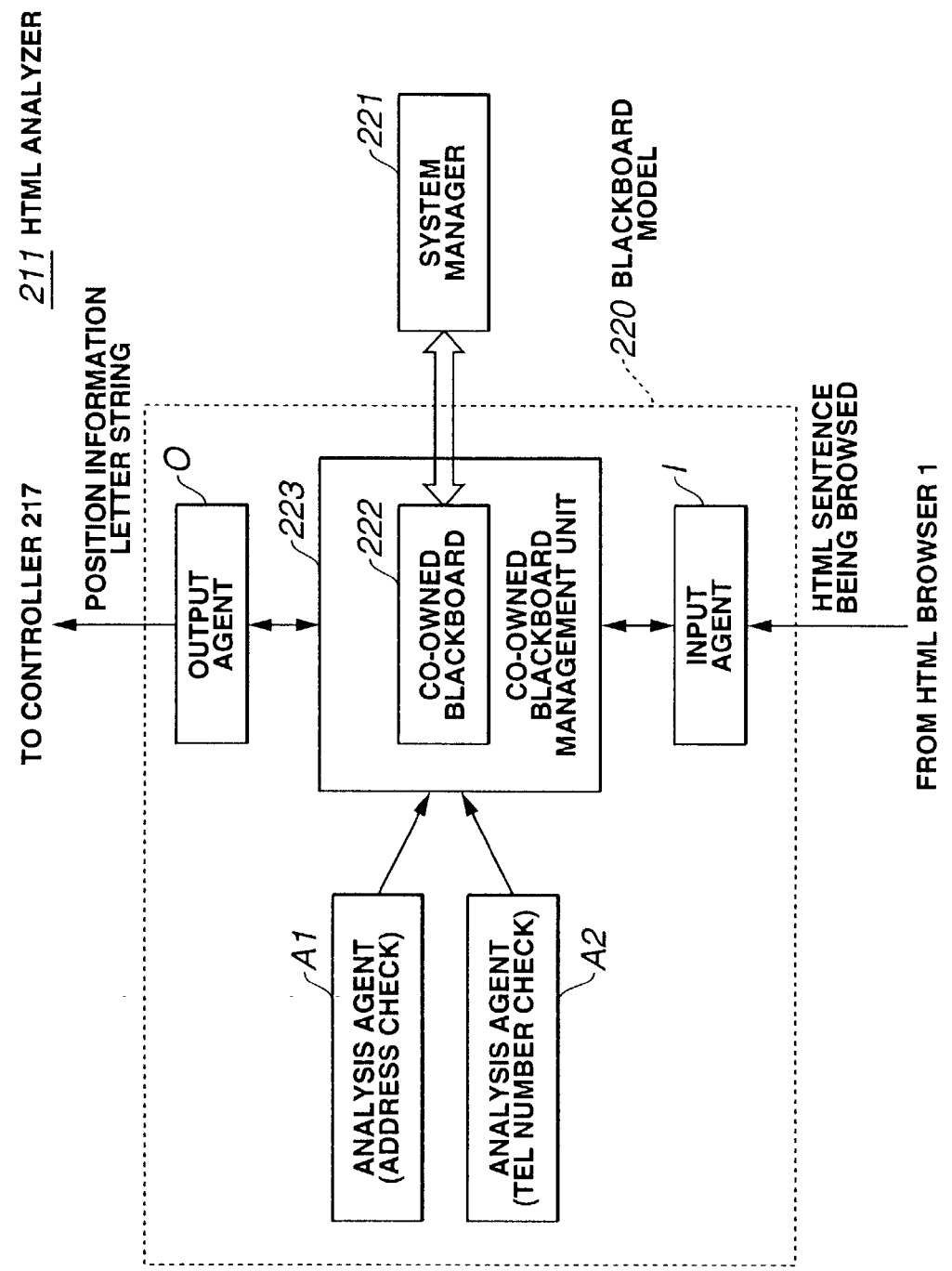
FIG. 2 shows a detailed structure of an HTML analyzer as an essential part of the HTML information processing apparatus.

Should this letter/character string analysis device be applied, the HTML analyzer 211 is made up by a blackboard model 220, and a system manager 221 controlling this blackboard model 220, as shown in FIG. 2.

The blackboard model 220 is such a problem solution system in which a large number of knowledge sources act in a concerted fashion through a co-owned memory termed a blackboard. The blackboard model is so termed because the system reminds one of an imaginary situation in which 'a large number of persons assemble before a blackboard to offer their knowledge together'.

The blackboard model 220 is constructed so that an input agent I and a plurality of analysis agents A1, A2 co-own a blackboard 222 and these analysis agents A1, A2 as knowledge sources perform concerted analyses to obtain results of analyses, that is a location information letter/character string, which location information string of letters or characters is then supplied through an output agent o and the controller 217 (5) to the location searcher 212 (6).

The input agent I captures the HTML document and subsequently sends a string expressed in a natural language to a co-owned blackboard management unit 223.

The system manager 221 requests the analysis agents A1, A2 to perform analysis processing through the co-owned blackboard management unit 223. The analysis agents A1, A2 are dedicated to specialized fields for discriminating the sort of the information denoted by letter/character strings. For example, the analysis agent A1 is destined for address recognition for verifying that the sort of the information denoted by a given string of letters or characters in question is the address, whilst the analysis agent A2 is destined for telephone number recognition for verifying that the sort of the information denoted by the string of letters or characters in question is the telephone number.

In actuality, when requested by the system manager 221 to carry out analysis processing, the analysis agent A1 specifies, for a sentence structure analysis section, not shown, within the co-owned blackboard management unit 223, a processing command in accordance with a preset grammar. The grammar herein denotes an analysis form used in discriminating the sort of the information of a letter/character string.

For example, if, in the grammar used by the analysis agent A1 (address analysis format), one of to-do-fu-ken (to, do, fu and ken mean the administrative division of Japan) and one of shi-ku- cho-son (shi, ku, cho and son mean administrative subdivision of Japan) are present in a given character string, based on an address database, as when the string of letters or characters runs: " . . . to (do, fu or ken) . . . ku (shi, cho or son) . . . ○-△-□", this portion of the string of characters or letter is recognized as meaning an address.

On the other hand, if, in the grammar used by the analysis agent A2 (address analysis format), the string of letters or characters denoting the telephone number or the string of letters TEL for example are followed by ten numerical digits, as when the string of letters or characters runs: "telephone number 03-1234-5678", or if for example ten numerical digits without regard to the string of letters or characters denoting the telephone number or the string of letters TEL are present in a given string of letters or characters, this portion of the string of characters or letter is recognized as meaning a telephone number.

The HTML document, thus captured by the input agent I, is converted into a preset letter/character string, and is sent to the co-owned blackboard management unit 223, so that a location information character string is extracted, in accordance with the respective grammars, by the analysis agents A1, A2, to whom a request has been made for analysis processing from the system manager 221. The so extracted location information string of letters or characters is supplied via controller 217 to the location searcher 212.

The location searcher 212 is connected to the site information database 213 and searches a site from the aforementioned location information letter/character string (6), afforded from the HTML analyzer 211 through the controller 217, to find the latitude/longitude information of the site in question. That is, the string of letters or characters representing the address is converted into the latitude/longitude information, while the string of letters or characters representing the telephone number is converted into the latitude/longitude information. The latitude/longitude information, represented by these location information letter/character strings, is sent through the controller 217 (7) to the map picture generating unit 214 (8).

The map picture generating unit 214 is connected to the map information database 215 and generates a near-by map picture of the supplied latitude longitude information based on the map information database 215. The map picture, generated by the map picture generating unit 214, is sent to the controller 217 (9). The controller 217 issues to the HTML reconstruction unit 216 a request for HTML reconstruction which is based on the map information (10).

The HTML reconstruction unit 216 creates a new HTML text, comprised of the original HTML codes, acquired from the HTML browser 201, and the aforementioned map picture buried in the codes. A request for display for demonstrating the new HTML text, reconstructed by the HTML reconstruction unit 216, is sent to the HTML browser 201 (11).

The HTML browser 201 then displays the new HTML document, re-constructed by the aforementioned HTML reconstruction unit 216, that is the HTML document, comprised of the original HTML and the map information buried therein.

Figure 3:
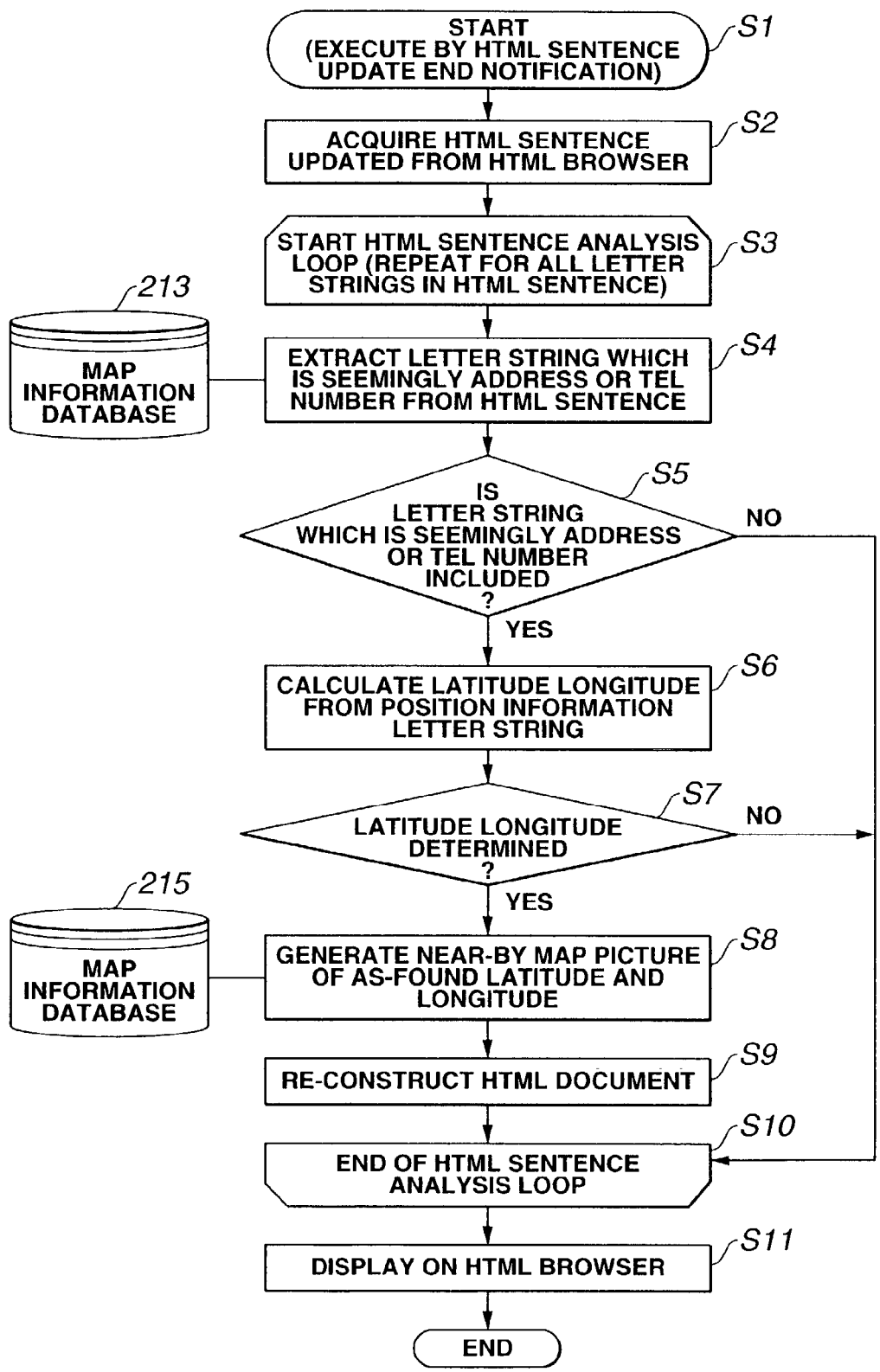
FIG. 3 is a flowchart for illustrating the processing carried out by respective portions of the HTML information processing apparatus.

FIG. 3 shows a flowchart for processing carried out by the respective units of the HTML information processing apparatus 210. First, at a time point when the HTML document, displayed on the HTML browser 201, has been completely read in, by the user operation, the HTML browser 201 notifies the end of the updating of the HTML document to the controller 217 (step S1).

The controller 217 then requests the HTML analyzer 211 to analyze the location information letter/character string in the HTML document. Responsive to this request for analysis, the HTML analyzer 211 requests the HTML browser 201 to acquire the HTML document, and acquires the HTML document, which has been updated and which is being browsed (step S2).

The HTML analyzer 211 starts the loop of analysis of the HTML document being browsed (step S3). This loop of analysis is repeated for the totality of strings of letters or characters in the HTML document and comes to a close at step S10, as will be explained subsequently.

In this analysis loop, the string of letters or characters, which is seemingly the address or the telephone number, that is the location information letter/character string, is first extracted at step S4 from the HTML document. The processing of extracting the location information letter/character string is carried out on the basis of the technique disclosed in the aforementioned Japanese Laying-Open Patent Publication 2000-339309.

If it has been determined at step S5 that there is included a string of letters or characters which is seemingly the address or the telephone number (YES), processing transfers to step S6. If it is determined that the location information letter/character string is not included (NO), processing transfers to step S10 to terminate the loop of analysis of the HTML document.

At step S6, the location searcher 212 calculates the latitude and the longitude of a given location, from the location information letter/character string received from the HTML analyzer 211 through the controller 217, using the site information database 213. When this latitude/longitude information is sent to the controller 217 (YES at step S7), the controller 217 sends the latitude/longitude information to the map picture generating unit 214. If the latitude/longitude cannot be calculated at the location searcher 212 from the location information letter/character string (NO at step S7), the HTML document analysis loop is terminated at step S10.

The map picture generating unit 214 receives the latitude/longitude information through the controller 217 and references the map information database 215 connected thereto to generate a near-by map picture (step S8). The map picture, generated in this map picture generating unit 214, is sent to the controller 217.

The controller 217 issues a request for re-constructing the HTML, which is based on the map picture, to the HTML reconstruction unit 216. At step S9, the HTML reconstruction unit 216 creates a new HTML document, comprised of the original HTML codes, acquired form the HTML browser 201, and the aforementioned map picture, buried in the HTML codes.

When the HTML document analysis loop from step S3 to step S10 has come to a close, the controller 217 causes the HTML document to be displayed in the HTML browser 201 (step S11). In actuality, if this step is to follow the re-construction of the new HTML document, performed at step S9, the controller 217 sends a display request for displaying the new HTML document, re-constructed by the HTML reconstruction unit 216, to the HTML browser 201, and subsequently demonstrates the new HTML document, having the map information buried therein, on the display screen.

Figure 4:
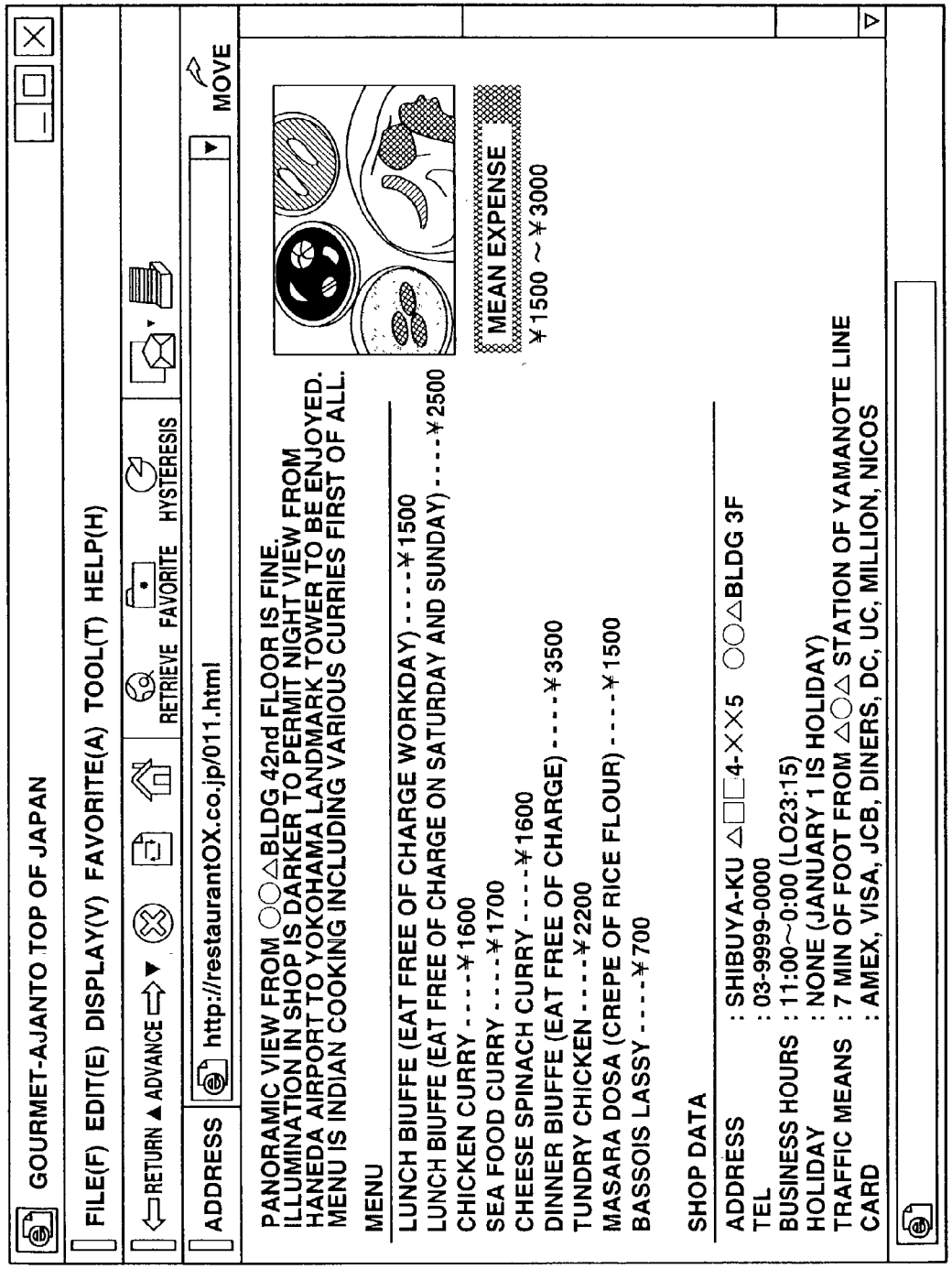
FIG. 4 illustrates the specified operation of the HTML information processing apparatus.
Figure 5:
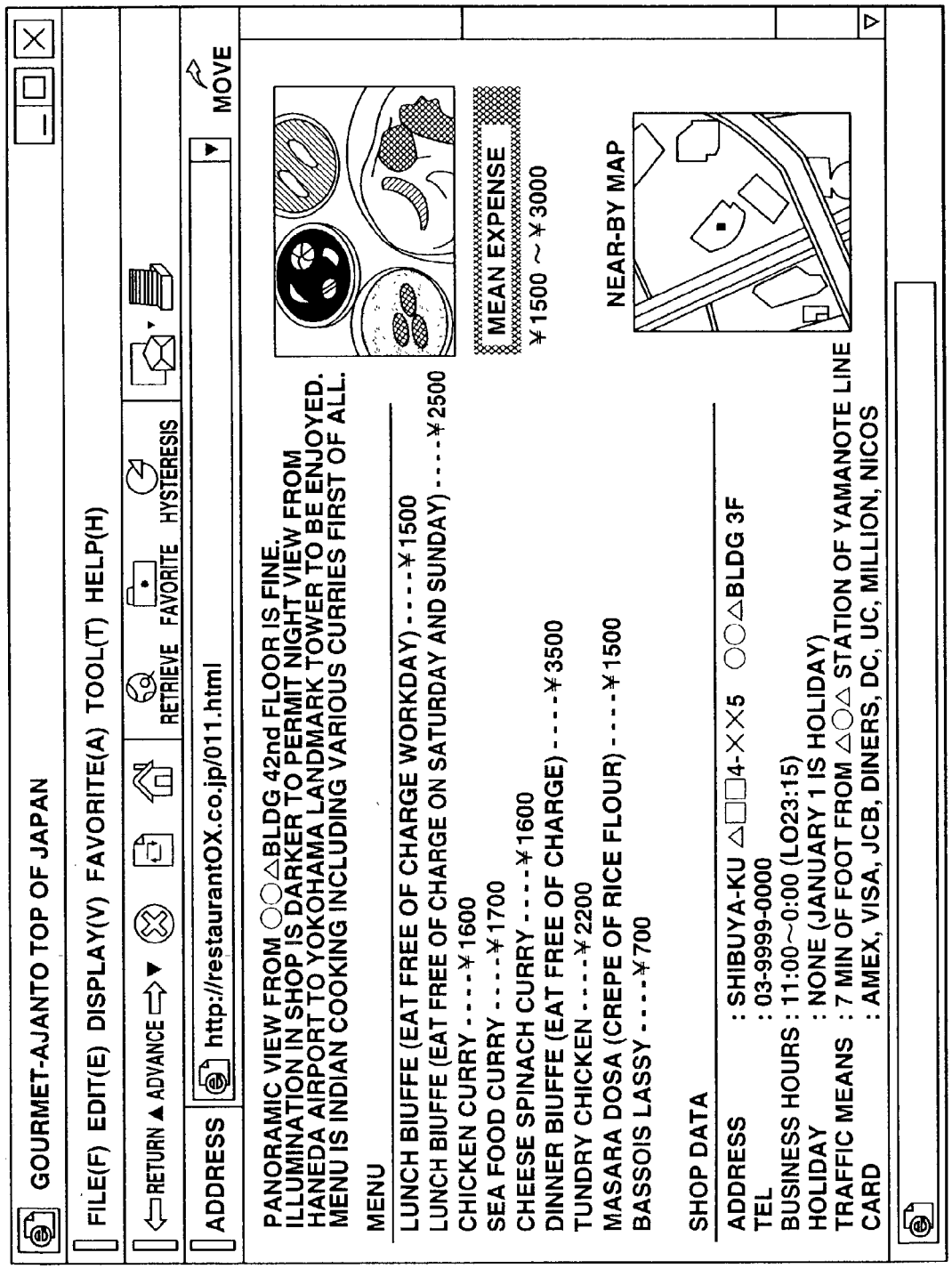
FIG. 5 illustrates the specified operation of the HTML information processing apparatus.

Referring to FIGS. 4 and 5, a specified instance of the operation of the HTML information processing apparatus 210 when the user has specified a home page of a restaurant on the HTML browser by inputting the URL is now explained. It is assumed that the HTML browser 201 has already been booted on the OS.

When the user has input on the HTML browser a URL: [http://restaurantox.co.jp/011.html], the menu, store data or a photo of a cooking of the restaurant, written with HTML, is sent as the HTML document from the specified WEB server, following a preset authentication processing, and is transferred to the browser for display on the display screen.

If, at a time point of completion of the readout of the HTML document, displayed on the HTML browser 201, the HTML browser 201 notifies the end of the updating of the HTML document to the controller 217, the controller 217 requests the HTML analyzer 211 to analyze the location information letter/character string in the HTML document. Responsive to this request for analysis, the HTML analyzer 211 requests the HTML browser 201 to acquire the HTML document, and acquires the HTML document of FIG. 4, which has been updated and which is being browsed.

The HTML analyzer 211 initiates the analysis loop of the HTML document being browsed, and extracts, from the HTML document, the location information letter/character string which is seemingly the address or the telephone number. Here, since there are letter/character strings: "address, Shibuya-ku, △○○4-xx-5○○△ bldg., third floor" and "TEL: 03-9999-0000" in a column of "store data", as shown in FIG. 4, the HTML analyzer 211 extracts one or both of these letter/character strings and sends the so extracted string(s) through the controller 217 to the location searcher 212.

From the letter/character string(s), received through the controller 217, the location searcher 212 calculates the latitude/longitude of the location in question, using the site information database 213, and sends the so calculated latitude/longitude of the location through the controller 217 to the map picture generating unit 214.

The map picture generating unit 214 generates a map picture of the vicinity of the restaurant, by referencing the map information database 215 connected thereto. The controller 217 sends a request for re-constructing the HTML to the HTML reconstruction unit 216 based on the map picture. The HTML reconstruction unit 216 creates a new HTML comprised of the original HTML codes acquired from the HTML browser 201 and the aforementioned map picture buried therein.

The controller 217 sends a display request for displaying the new HTML document, re-constructed by the HTML reconstruction unit 216, and subsequently demonstrates the new HTML document, in which is buried the map information, on the display screen. This demonstrates the map of the restaurant and the neighboring area in the HTML document, as shown in FIG. 5.

With the HTML information processing apparatus 210, described above, and the structure of which is shown in FIG. 1, a map can be supplied to the browsing party (user), if the address or the telephone number of the installation, such as restaurant, is stated in the HTML document, even though the scheme of displaying the map picture is not stated therein by the producer of the HTML document (information provider). Thus, the user feels it easier to grasp the geography.

A second embodiment of the present invention is now explained. This second embodiment is also an HTML information processing apparatus for demonstrating the HTML document on a display screen.

Figure 6:
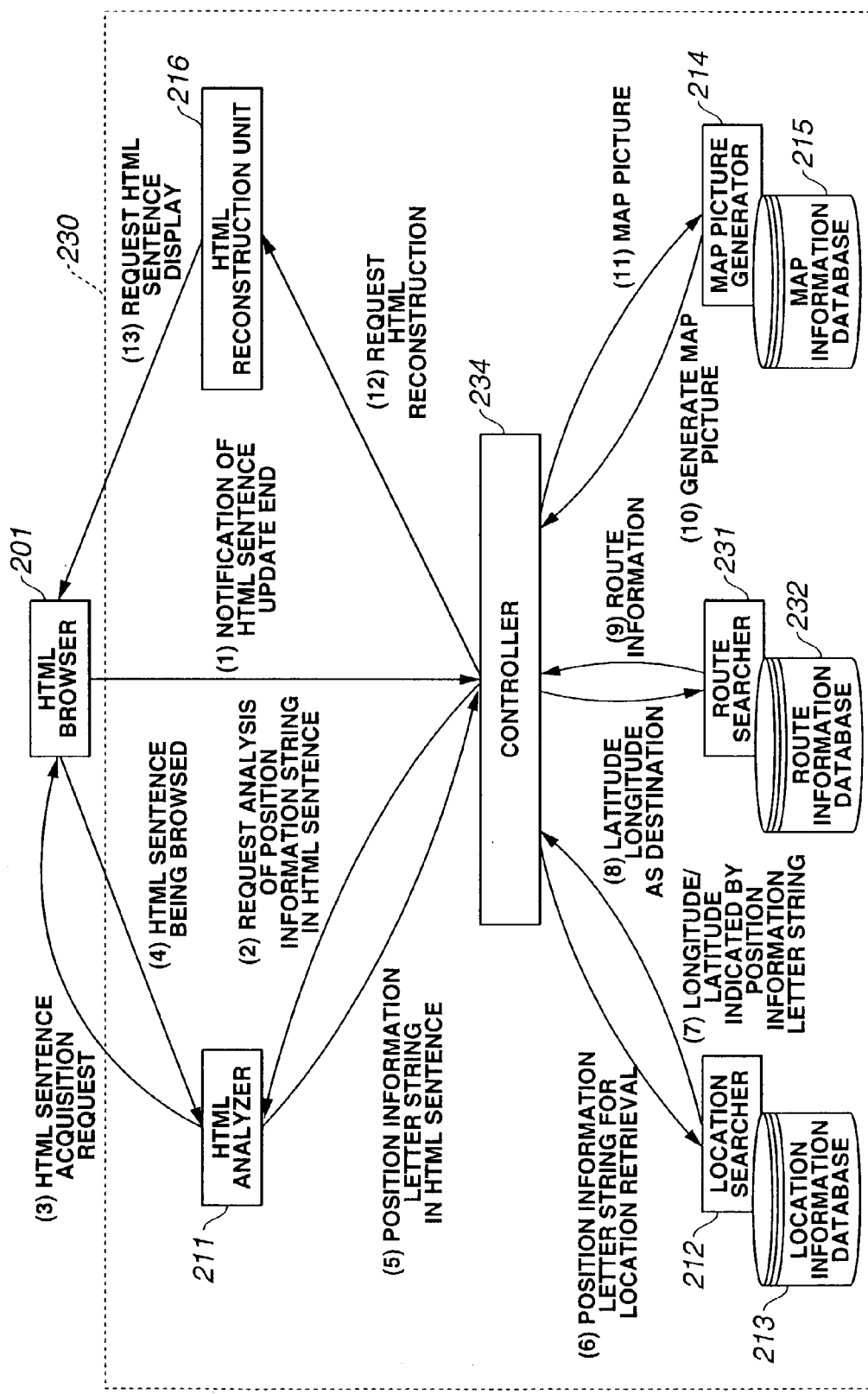
FIG. 6 is a block diagram showing the structure of an HTML information processing apparatus according to a second embodiment of the present invention.

FIG. 6 shows the structure of this HTML information processing apparatus 230. This HTML information processing apparatus 230 differs in structure from the HTML information processing apparatus 210 of the first embodiment shown in FIG. 1 in that there is newly provided a route searcher 231 for searching a path reaching the location, as searched by the location searcher 212, from the current location. The route searcher 231 is connected to a route information database 232. There is, moreover, a difference that a controller 234 for controlling the various components inclusive of the route searcher 231 is provided in place of the controller 217 of FIG. 1.

The route searcher 231 searches the route between two specified locations. There are two possible routes, namely a route employing public means of traffic, such as electrical rolling stock, and a route employing a way.

Meanwhile, the map picture generating unit 214 generates a map picture, comprehending the totality of routes output by the route searcher 231, by referencing the map information database 215.

The controller 234 issues to the HTML reconstruction unit 216 a HTML re-constructing request, which is based on the map information encompassing the totality of routes.

The HTML reconstruction unit 216 corrects the original HTML codes, acquired from the HTML browser 201, in order to make synthetic display of a map picture encompassing the totality of routes. That is, the HTML reconstruction unit 216 corrects the HTML document so that a map picture generated by the map picture generating unit 214 and which encompasses the totality of routes will be synthetically displayed in the original HTML document demonstrated on the display picture.

The operation of this HTML information processing apparatus 230 is hereinafter explained.

When a HTML document updating end notice is sent from the HTML browser 201 to the controller 217 ((1) of FIG. 6), the controller 234 requests the HTML analyzer 211 to analyze the location information letter/character string in the HTML document (2). The HTML analyzer 211 is responsive to the aforementioned analysis request to request the HTML browser 201 to acquire the HTML document (3). When the HTML analyzer 211 acquires from the HTML browser 201 the HTML document being browsed (4), the HTML analyzer analyzes the HTML document being browsed to extract the location information letter/character string contained therein.

The location information letter/character string, extracted by the HTML analyzer 211, is sent through controller 234 to the location searcher 212. The location searcher 212 searches a location in question from the location information letter/character string (6) and finds the latitude/longitude information of the location by referencing the site information database 213. The latitude/longitude information indicated by the location information letter/character string is sent (7) through controller 234 to the route searcher 231 (8).

The route searcher 231 searches the route reaching the latitude/longitude information of the aforementioned location from the current location by referencing the route information database 232. The route search carried out by the route searcher 231 becomes possible by applying the 'navigation method' of the Japanese Laying-Open Patent Publication 2000-337911, disclosed by the present Assignee, or by other known route searching or navigation methods.

For example, the 'navigation method' of the Japanese Laying-Open Patent Publication 2000-337911 calculates the route based on the latitude/longitude information of the destination and the current location information as found by a location measurement unit.

The route information, calculated by the route searcher 231, is sent to the controller 234 (9). The controller 234 sends the route information to the map picture generating unit 214 (10) to cause the map picture generating unit 214 to generate a map picture encompassing the totality of routes. The map picture, so generated, is sent to the controller 234 (11). The controller 234 sends to the HTML reconstruction unit 216 a request for reconstruction of HTML which is based on the map picture encompassing the totality of routes (12).

The HTML reconstruction unit 216 creates a new HTML document, comprised of the original HTML codes, as acquired from the HTML browser 201, and a map picture encompassing the totality of routes, buried in the codes. The HTML reconstruction unit 216 then sends to the HTML browser 201 a display request for demonstrating the new HTML document re-constructed in the HTML reconstruction unit 216 (13).

This causes the HTML browser 201 to demonstrate the new HTML document, re-constructed by the aforementioned HTML reconstruction unit 216, that is the original HTML in which is buried the map picture encompassing the routes from the current location to the site of destination.

Figure 7:
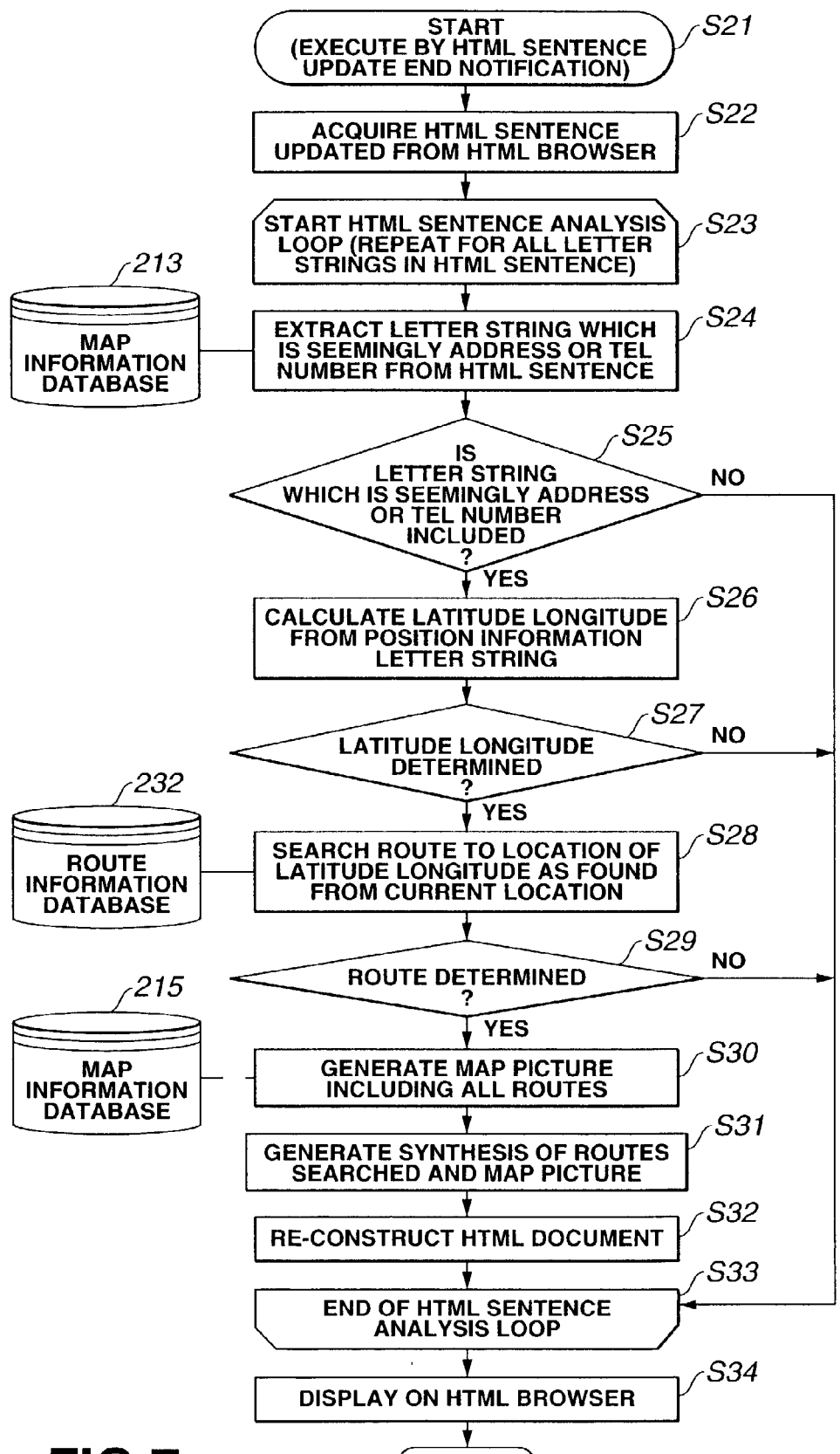
FIG. 7 is a flowchart for illustrating the processing performed by respective portions making up the HTML information processing apparatus.

FIG. 7 shows a flowchart of the processing executed by various units of the HTML information processing apparatus 230.

First, at a time point the HTML document displayed on the HTML browser 201 has been completely read in, as a result of the user's operations, the HTML browser 201 notifies the end of the updating of the HTML document to the controller 234 (step S21).

The controller 234 then requests the HTML analyzer 211 to analyze the location information letter/character string in the HTML document. Responsive to this request, the HTML analyzer 211 requests the HTML browser 201 to acquire the HTML document, whereby the HTML document, which has been updated and is being browsed, is acquired (step S22).

The HTML analyzer 211 begins the loop of analysis of the HTML document being browsed (step S23). The analysis loop is repeated for the totality of the letter/character strings, and is terminated at step S33, as will be explained subsequently.

In the course of the analysis loop, the letter/character string, which is seemingly the address or the telephone number, that is the location information letter/character string, is extracted at step S24 from the HTML document. This operation is carried out based on for example the technique disclosed in the aforementioned Japanese Laying-Open Patent Publication 2000-339309.

If it is determined at step S25 that the there is contained the letter/character string, which is seemingly the address or the telephone number, that is the location information letter/character string (YES), processing transfers to step S26. If it is determined that there is not contained such letter/character string (NO), processing transfers to step S33 to terminate the loop of document analysis.

At step S26, the location searcher 212 calculates, from the location information letter/character string, received through the controller 234 from the HTML analyzer 211, the latitude/longitude of the site in question, using the site information database 213. When this latitude/longitude information has been sent to the controller 234 (YES at step S27), the controller 234 sends the latitude/longitude information to the route searcher 231. If the latitude/longitude cannot be calculated from the aforementioned location information letter/character string at the location searcher 212 (NO at step S27), the HTML document analysis loop is terminated at step S33. The route searcher 231 searches the route reaching the latitude/longitude information of the aforementioned site, from the current site, by referencing the route information database 232, based on the technique disclosed for example in the Japanese Laying-Open Patent Publication 2000-337911 (step S28). When this route information is supplied to the controller 234 (YES at step S29), the controller 234 sends the route information to the map picture generating unit 214. If the route cannot be searched by the route searcher 231 from the aforementioned latitude/longitude (NO at step S29), the HTML document analysis loop is terminated at step S33.

The map picture generating unit 214 receives the aforementioned route information from the controller 234 and generates a map picture encompassing the totality of the routes, by referencing the map information database 215 connected thereto (step S30). The map picture, generated by the map picture generating unit 214, is sent to the controller 234.

The controller 234 issues to the HTML reconstruction unit 216 an HTML re-construction request, based on the map picture. The HTML reconstruction unit 216 then creates at step S31 a new HTML document, comprised of the oroginal HTML codes acquired from the HTML browser 201 and the aforementioned map picture buried therein, to re-construct the HTML document (step S32).

When the HTML document analysis loop from step S23 to step S33 has come to a close, the controller 234 causes the HTML browser 201 to display the HTML document (step S34). In actuality, if this operation follows the HTML document re-construction, performed at step S32, the controller 234 sends a display request for demonstrating the new HTML document, re-constructed at the HTML reconstruction unit 216, to the HTML browser 201, and subsequently demonstrates the new HTML document, having the map picture buried therein, on the display screen.

A specified instance of the operation of the HTML information processing apparatus 230, that is carried out when the user has specified the home page of a restaurant on the HTML browser by inputting the corresponding URL, is now explained with reference to FIGS. 4 and 8. It is assumed that the HTML browser 201 has already been booted on the OS.

First, if the user has entered on the HTML browser a URL reading: "http://restaurant○x.co.jp/011.html", the menu or the shop data, written in HTML, or the photo of cooking is sent, after preset authentication connection processing, as the HTML document, from the specified Web server, and is transferred to the browser, for demonstration on the display screen.

If, at a time point when the HTML document, demonstrated on the HTML browser 201, has been read in, the HTML browser 201 has notified the fact of end of updating of the HTML document to the control 234, the controller 234 requests the HTML analyzer 211 to analyze the location information letter/character string in the HTML document. The HTML analyzer 211 is responsive to this request for analysis to request the HTML browser 201 to acquire the HTML document, whereby the HTML document, which has been updated and which is being browsed, as show in FIG. 4, is acquired.

The HTML analyzer 211 initiates the analysis loop of the HTML document, being browsed, to extract the location information letter/character string which is seemingly the address or the telephone number. Here, since there is a letter/character string reading: "address: Shibuya-ku, △○○4-xx-5○○△ bldg., third floor" and "TEL: 03-9999-0000" in a column of "store data", as shown in FIG. 4, the HTML analyzer 211 extracts one or both of these letter/character strings and sends the so extracted string(s) through the controller 234 to the location searcher 212.

From the location information letter/character string, received via controller 234, the location searcher 212 calculates the latitude/longitude of the location in question, using the site information database 213, to send the so calculated latitude/longitude of the site through the controller 234 to the route searcher 231.

The route searcher 231 searches the route reaching the latitude/longitude information of the site in question, from the current location, by referencing the route information database 232. The route so searched is sent through the controller 234 to the map picture generating unit 214.

The map picture generating unit 214 generates the map picture, encompassing the totality of the route information, by referencing the map information database 215 connected thereto. The controller 234 issues to the HTML reconstruction unit 216 a HTML re-construction request, based on the map picture. The HTML reconstruction unit 216 forms a new HTML, comprised of the original HTML codes, acquired from the HTML browser 201, and the aforementioned map information, buried therein.

The controller 234 sends to the HTML browser 201 a display request for demonstrating the new HTML document re-constructed by the HTML reconstruction unit 216, to the HTML browser 201, and subsequently demonstrates the new HTML document, having the map picture buried therein, on the display screen. As a consequence, a peripheral map encompassing the totality of the routes from the current location to the restaurant (indicated in FIG. 8 as the route retrieval result) is displayed in the HTML document, as shown in FIG. 8.

With the HTML information processing apparatus 230, described above, and the structure of which is shown in FIG. 6, a map encompassing the totality of routes to an installation of destination, associated with the user's current location, can be supplied to the browsing party (user), if the address or the telephone number of the installation, such as restaurant, is stated, even though the scheme of displaying the map picture is not stated beforehand by the producer of the HTML document (information provider). Thus, the user feels it easier to grasp the geography and may be guided in his or her movement to the installation of destination.

Another embodiment of the present invention is hereinafter explained. This other embodiment is directed to a client terminal in which the processing performed by the HTML information processing apparatus 210 or 230 is performed not by a hardware but as a software. The client terminal is referred to below simply as a client.

Figure 9:
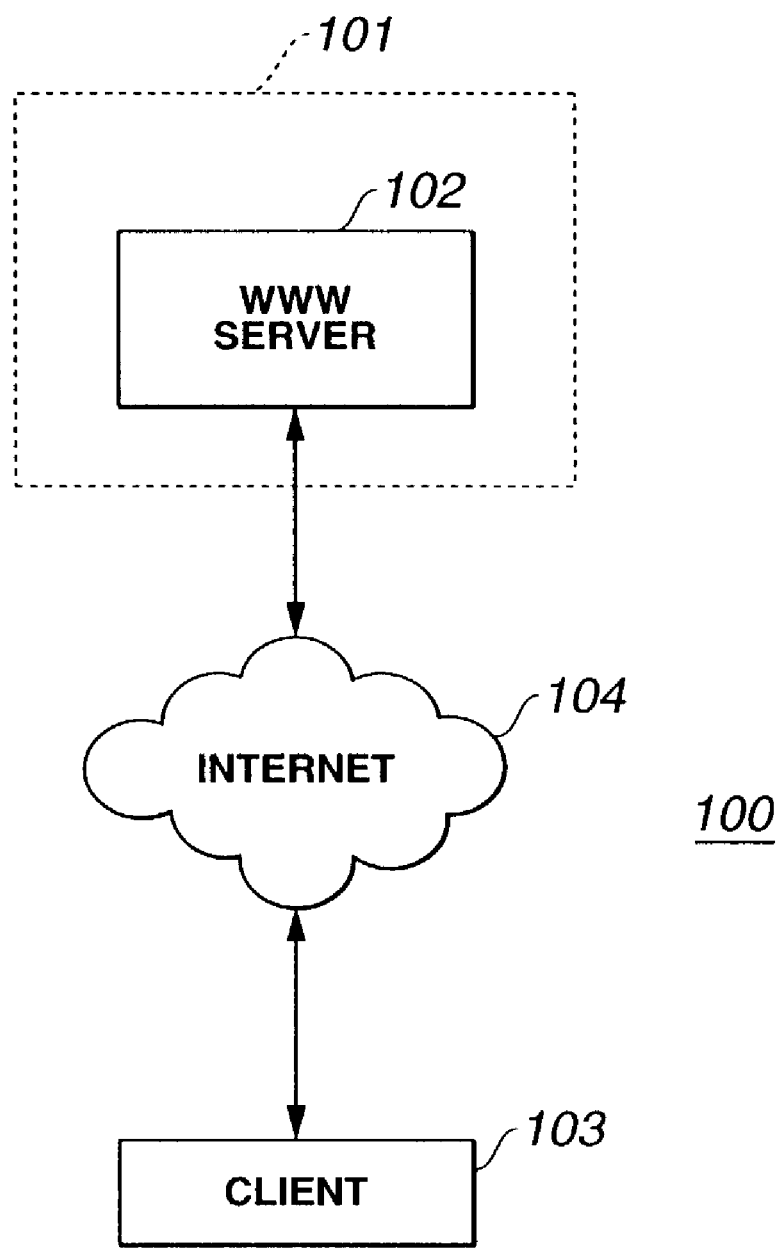
FIG. 9 is a block diagram showing the structure of the HTML information processing apparatus.

This client is built in the HTML information processing system shown in FIG. 9. In the HTML information processing system, a WWW server 102, as an information processing apparatus, owned by an Internet service provider 101 (referred to below simply as a provider), and a client 103, as an information processing apparatus, are interconnected over the Internet 104. A Web page is displayed on the screen by causing the client 103 to receive the HTML file, supplied by the WWW server 102, and by causing the WWW browser to analyze the so received HTML file.

Figure 10:
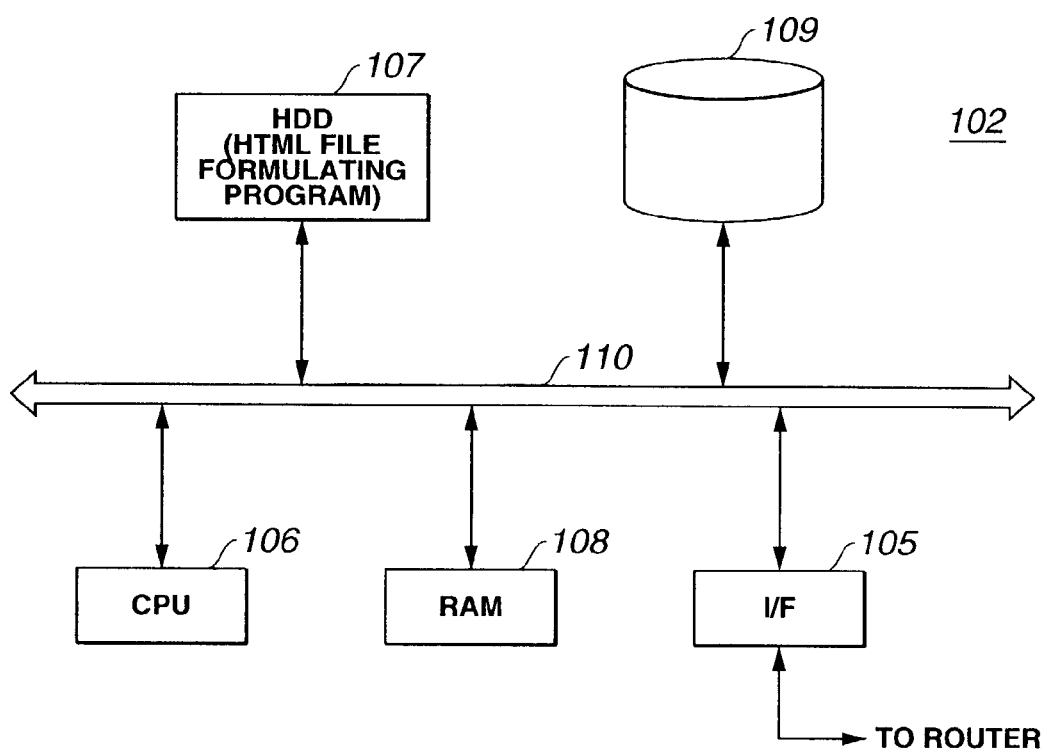
FIG. 10 is a block diagram showing the structure of a WWW server.

The WWW server 102 is connected over a router to the Internet 104, as shown in FIG. 10. A Web page transfer request from the client 103 is received over an interface 105 and a bus 110 by a CPU (Central Processing Unit) 106.

The CPU 106 reads out an HTML file creating program, stored in a hard disc drive (HDD) 107, based on the transfer request, to boot the program on a RAM 108. The CPU also retrieves and reads out a particular file from the database 109, in accordance with the HTML file creating program, to create a HTML file, based on this file, to send the so prepared HTML file through the interface 105 and the router to the client 103.

That is, on receipt of the transfer request from the client 103, the WWW server 102 reads out a specified file from the database 109 to dynamically prepare the HTML file. It is also possible to create a specified HTML file and to store the so prepared file in the database 109.

Figure 11:
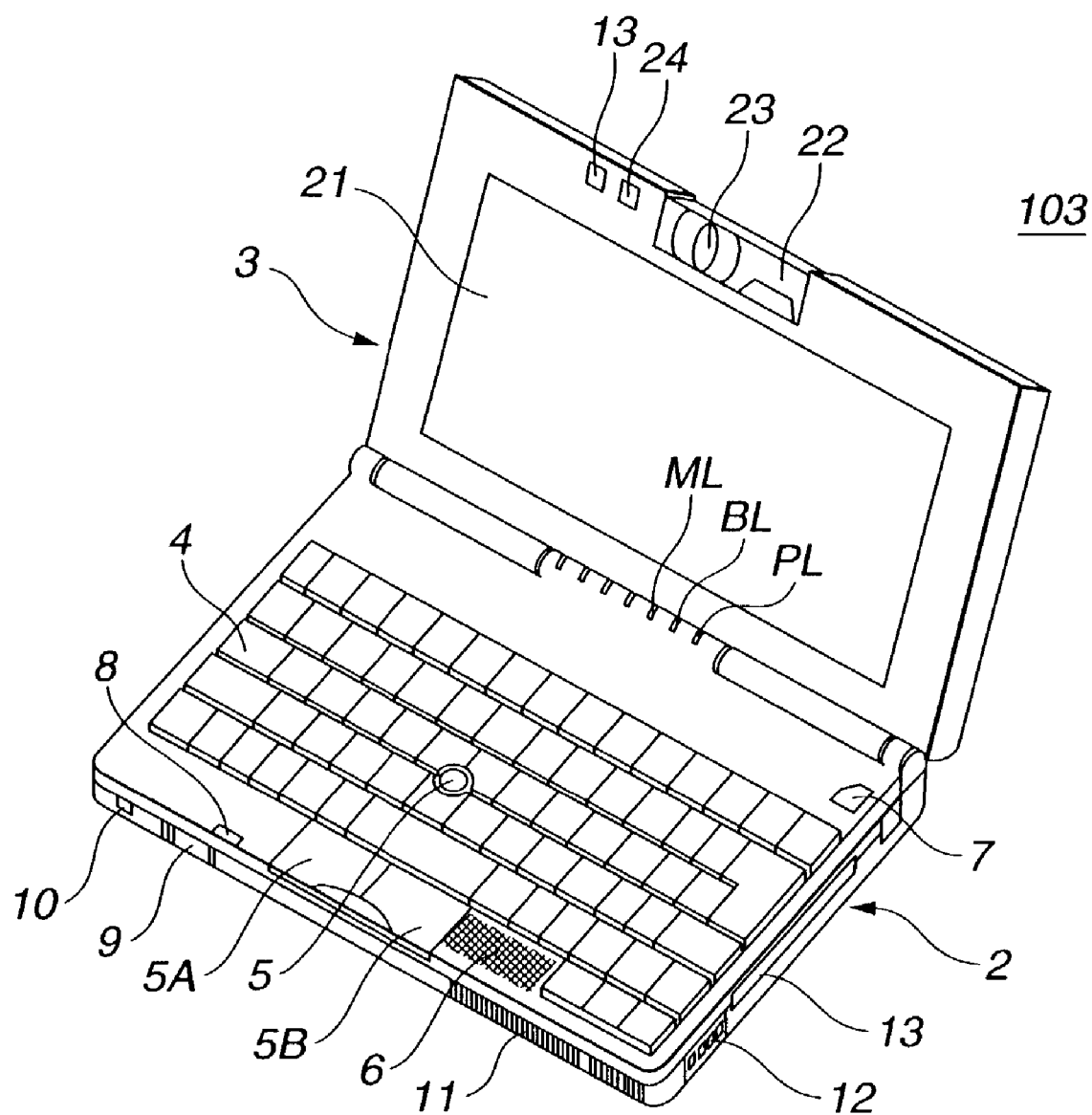
FIG. 11 is a perspective view of a client.

The structure of the client 103 in a HTML information processing system 100 is hereinafter explained. Referring to FIG. 11, the client 103 is an easy-to-carry portable personal computer, with a size not larger than the B5 format, and is made up by a main body unit 2 and a display unit 3 mounted for opening/closure with respect to the main body unit 2.

The main body unit 2 includes, on its upper surface, a plural number of operating keys 4 for inputting various letters, symbols or numerical figures, a stick type pointing device 5, actuated on causing movement of a cursor, input and displayed on the display unit 3, an enclosed loudspeaker 6, and a shutter button 7 acted on in photographing an image by a CCD (charge coupled device) camera 23 provided on the display unit 3.

On the front side of the display unit 3, there is provided a liquid crystal display (LCD) 21, and an imaging unit 22, including a CCD camera 23, is mounted at a front side center upper end for rotation relative to the display unit 3.

Figure 12:
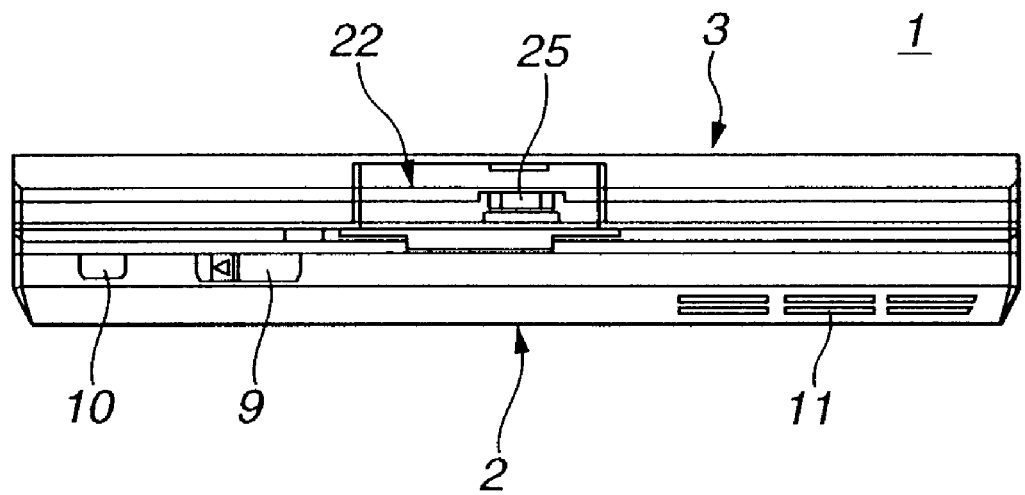
FIG. 12 is a front view of a main body unit of the client.

That is, the imaging unit 22 is adapted for being rotated through 180° between the front side and the back side of the display unit 3 and for being fixed at an arbitrary position. The imaging unit 22 is provided with an adjustment ring 25 for focussing adjustment of the CCD camera 23, as shown in FIG. 12.

Figure 15:
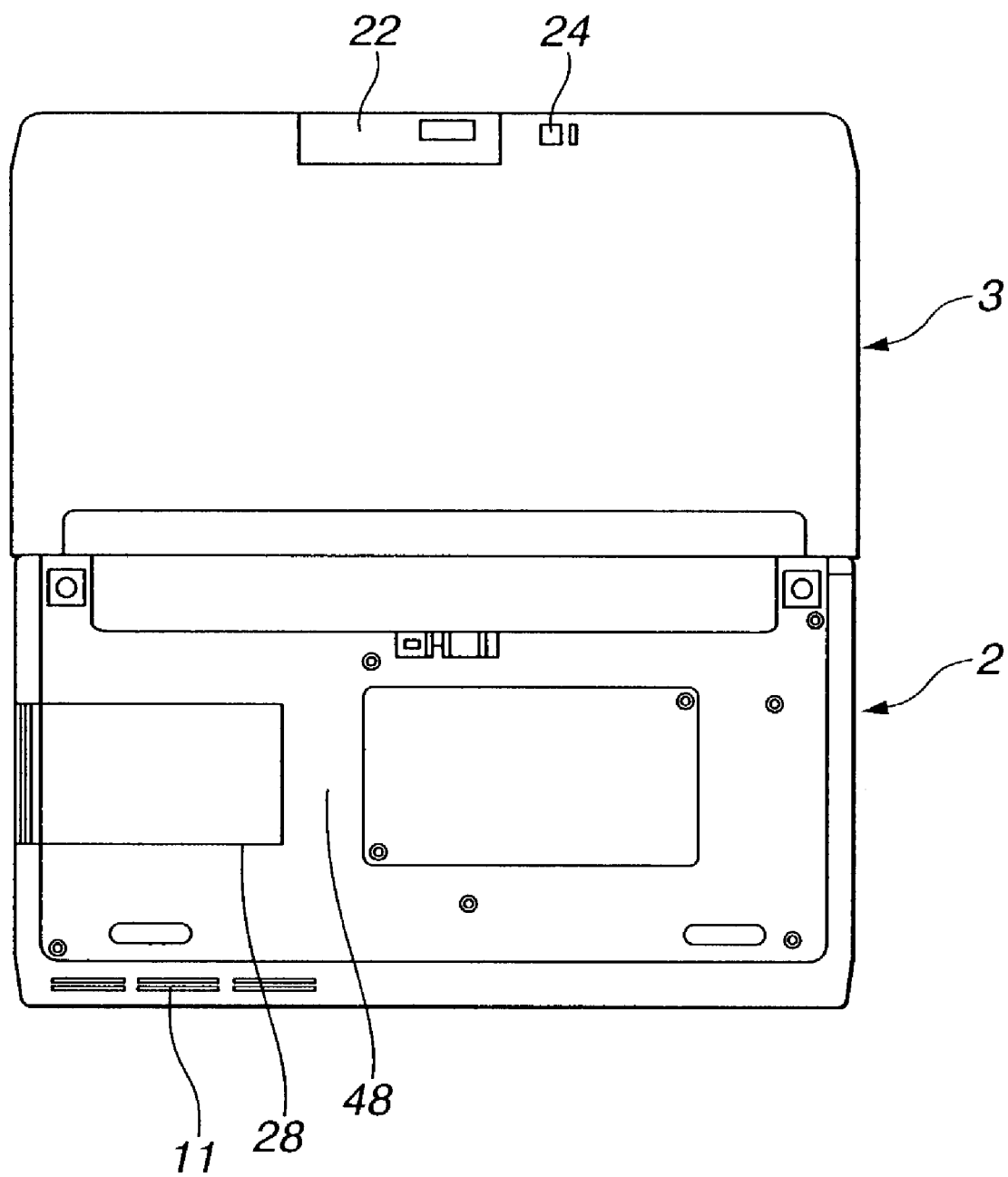
FIG. 15 is a bottom plan view of the main body unit.

On the front side of the display unit 3 (FIG. 11), on the left neighboring portion of the imaging unit 22, there is provided a microphone 24, whereby the sound may also be collected from the back side of the display unit 3 through this microphone 24 (FIG. 15).

On the front side center lower end of the display unit 3, there are provided a power supply lamp PL, comprised of an LED (light emitting diode), a cell lamp BL, a message lamp ML and other lamps adapted for coping with various other uses.

On the front side upper end of the display unit 3, on the left neighboring side of the microphone 24, there is provided a pawl 13. In a preset portion of the main body unit 2, in register with the pawl 13, there is provided an opening 8, so that the pawl 13 may be fitted in the opening 8 for locking, as the display unit 3 is closed on the main body unit 2.

On the front side of the main body unit 2, there is provided a slide lever 9, as shown in FIG. 11. This slide lever 9 may be slid in a direction indicated by arrow along the front surface to release the pawl 13 from the opening 8 to enable the display unit 3 to be opened with respect to the main body unit.

At the left end on the front surface of the main body unit 2, there is provided a programmable power key (PPK key) 10 for booting a preset application software (simply an application) from the power on state by one button application to automatically execute a sequence of preset operations. At the right end, there are provided plural suction openings 11.

Figure 13:
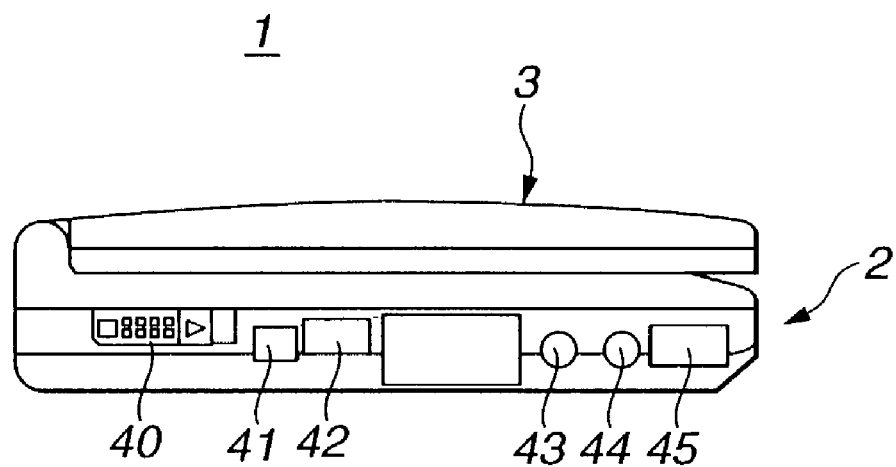
FIG. 13 is a side view showing the state in which a display unit has been closed with respect to the main body unit.

On the left lateral side of the main body unit 2, there are provided a slide type power supply switch 40, an IEEE (institute of Electrical and Electronic Engineers) 1394 terminal 41 for coping with 4 pins, a USB (universal serial bus) terminal 42, an input terminal for a microphone 43, a headphone terminal 44 and an infrared port 45, complying with IrDA (Infrared Data Association), as shown in FIG. 13.

Figure 14:
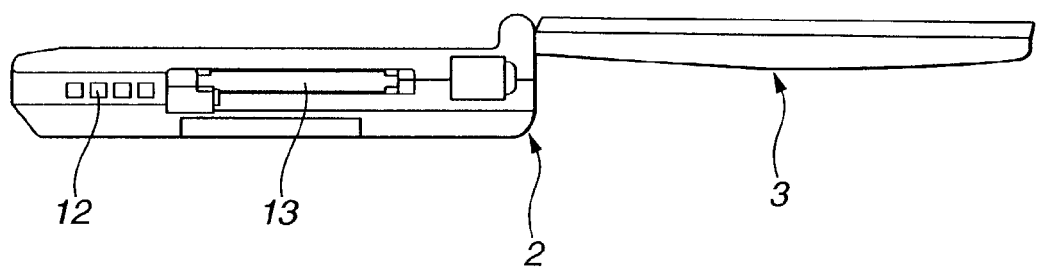
FIG. 14 is a right side view showing the state in which the display unit has been opened 180° with respect to the main body unit.

On the right hand side of the main body unit 2, there is provided an exhaust opening 12, as shown in FIG. 14. On the right neighboring side of the exhaust opening 12, there is provided a PC card slot 13, which PC card slot 13 is used for inserting a PCMCIA (Personal Computer memory card International Association) card, referred to below as the PC card.

On the bottom surface of the main body unit 2, there are provided a lid 26 for covering the opening 25 for mounting an extended memory, and a pin inserting opening 48 for disengaging the lock pawl of the lid 26, as shown in FIG. 15.

The circuit structure of the client is hereinafter explained.

Figure 16:
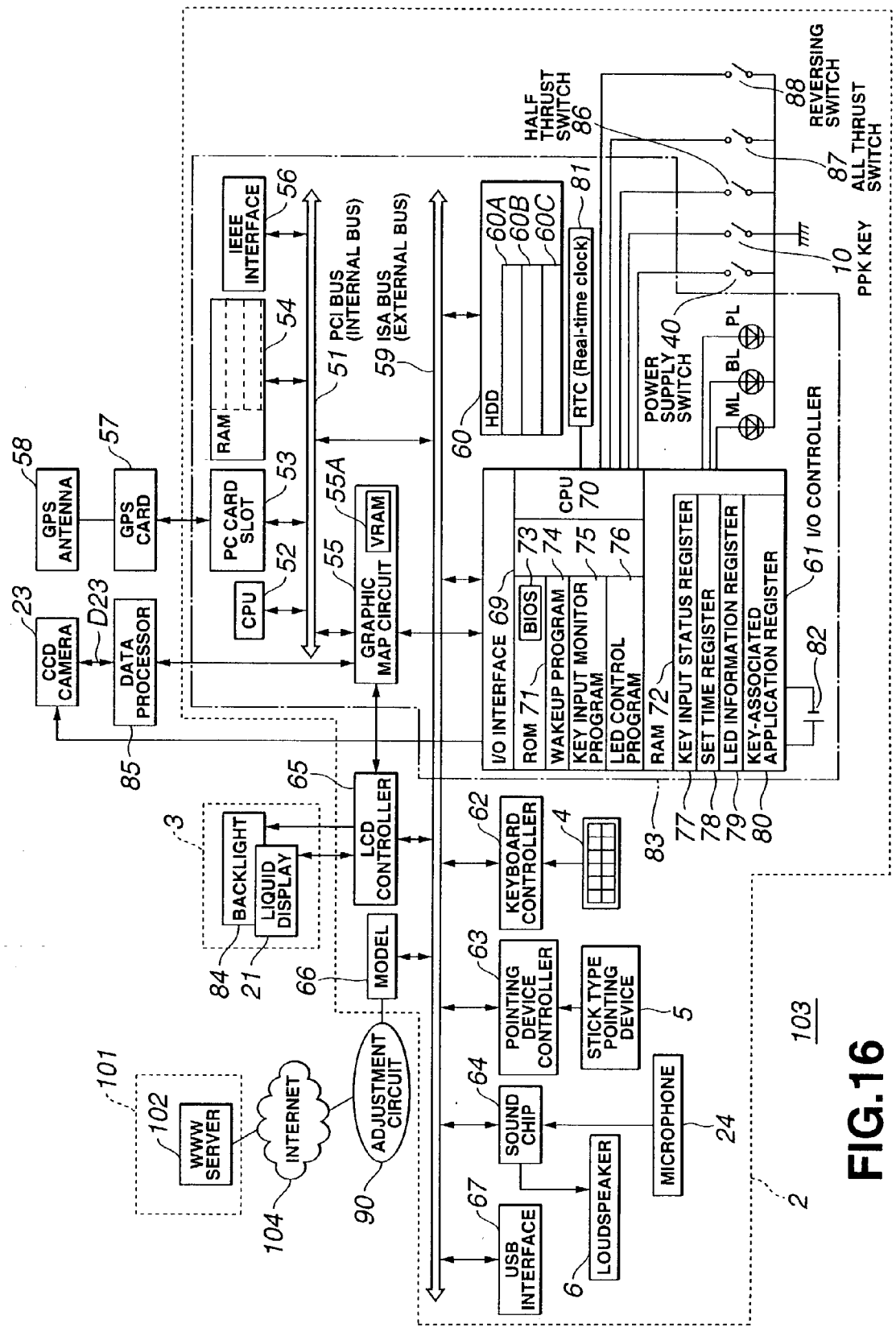
FIG. 16 shows a circuit structure of the client.

Referring to FIG. 16, showing the main body unit 2 of the client 103, a CPU (central processing unit) 52, the PC (personal computer) card slot 13, a RAM (random access memory) 54, a graphics processing circuit 55 for generating a picture displayed on a liquid crystal display 21 of the display unit 3, and an IEEE interface 56 directly coupled to an IEEE 1394 terminal 41 connected to another computer device or to external equipment for capturing digital data, are connected to a PCI (peripheral component interconnect) bus 51 of a booting sequence controller 83.

The CPU 52 is a controller for comprehensively controlling various functions of the main body unit 2, and is adapted to execute various programs loaded on the RAM 54 to execute the various functions.

The PCI bus 51 is connected to an ISA (Industrial Standard Architecture) bus 59. To this ISA bus 59, there are connected a hard disc drive 60, an I/O (In/Out) controller 61, a keyboard controller 62, a pointing device controller 63, a sound chip 64, an LCD controller 65, a modem 66 and a USB interface 67.

The keyboard controller 62 controls the inputting of a control signal responsive to the depression of the operating key 4 (FIG. 11), while the pointing device controller 63 controls the inputting of the control signal by the stick type pointing device 5 (FIG. 11).

The sound chip 64 captures the speech input from the microphone 24 (FIG. 11) or sends speech signals to an enclosed loudspeaker 6 (FIG. 11), while the modem 66 connects to the WWW server 102 of the provider 101 through a public telephone network 90 and over the Internet 104. Meanwhile, the USB interface 67 is connected to the USB terminal 42 for connection to peripheral devices, such as USB mouse or flexible disc drive.

In the hard disc drive 60, there are enclosed an OS (operating system) comprised of Window 98 (trademark) 60A, the aforementioned HTML browser 60B, an HTML information processing program 60C for executing HTML information processing based on the information processing method of the present invention, and a variety of application software, not shown, these being read out by the CPU 52 as necessary for loading on the RAM 54.

The I/O controller 61 is comprised of interconnection of an I/O interface 69, a CPU 70, a ROM (read-only memory) 71 comprised of an EEPROM (electrically erasable and programmable read-only memory), and a RAM 72, and is fed with the current time at all times by an RTC (real-time clock) 81.

In the ROM 71 of the I/O controller 61, there are stored BIOS (basic input/output system) 73, a wake-up program 74, a key input monitor program 75 and an LED control program 76, whereas, in the RAM 72, there are provided a key input status register 77, a setting time register 78, an LED control register 79 and a key accommodating application register 80.

The key input status register 77 stored in the RAM 72 is adapted to store an operating key flag. The CPU 70 monitors, based on the key input monitor program 75, whether or not the PPK key 10 (FIG. 12) for one-touch operation has been pressed. When the PPK key 10 is pressed, the operating key flag is stored in the key input status register 77.

In the setting time register 78, the time information, such as start time optionally set by the user at the outset, can be stored. Based on the wake-up program 74, the CPU 70 detects whether or not the current time as afforded by the RTC 81 is an optionally set start time. When the time is the start time, the CPU executes preset processing.

The key accommodating application register 80 holds the relationship of correspondence between the PPK key 10 or the operating keys 4 of plural combinations, on one hand, and the application to be booted, on the other hand, in association with the PPK key 10 or the preset combinations of the operating keys 4. When the PPK key 10 of a preset combination of the operating keys 4 is pressed, the CPU 70 sends control data for booting the corresponding application to the CPU 52, through the ISA bus 59 and the PCI bus 51, in this order, thereby booting the application software corresponding to the control data by the CPU 52.

When the application software stored in the key accommodating application register 80 is booted to terminate the operation, an end flag is stored in the LED control register 79. On detection of storage of the end flag in the LED control register 79, based on the LED control program 76, the CPU 70 causes a message lamp ML to be turned on.

The LED control register 79 memorizes a power supply flag and a cell flag when the power supply flag is pressed and when the main body unit 2 is actuated under the source voltage supplied from a battery, respectively. Thus, when the CPU 70 detects that the power supply flag or the cell flag has been stored, based on the LED control program 76, the CPU 70 causes the power supply lamp PL and the battery lamp BL to be turned on.

The I/O controller 61 is designed so that, since a backup battery 82 is connected to the I/O controller 61, data of the key input status register 77, setting time register 78, LED control register 79 and the key accommodating application register 80 of the RAM 72 may be held even if the power supply switch 40 of the main body unit 2 is turned off such that no power is being supplied from a power supply, not shown.

An inverter switch 88, connected to the I/O controller 61, is turned on when the imaging unit 22 (FIG. 11) has been rotated through 180° in a direction of imaging the opposite side of the liquid crystal display 21 of the display unit 3. The inverter switch notifies the state to the CPU 70. The PPK key 10 also notifies the state to the CPU 70, as when the inverter switch 88 has been pressed.

A half-thrust switch 86 is turned on when the shutter button 7 provided on the upper surface of the main body unit 2 is thrust partway to notify the state to the CPU 70 of the I/O controller 61, while a full-thrust switch 87 is turned on when the shutter button 7 has been completely thrust to notify the state to the CPU 70 of the I/O controller 61.

That is, when the user thrusts the shutter button 7 partway as the capture software, among the various applications of the hard disc drive 60, is in the booted state, the CPU 70 of the I/O controller 61 enters into a still picture mode, with the CPU controlling the CCD camera 23 to execute the freezing of the still image. When the user has thrust the shutter button completely, the CPU captures the frozen still image data to send it to a data processing unit 85.

If the moving picture mode is set in as the capture software 60A is not booted, the CPU 70 of the I/O controller 61 captures a moving picture up to a maximum of the order of 60 seconds, and sends out the so captured moving picture to the data processing unit 85.

The I/O controller 61 is also configured for controlling the graphics processing circuit 55, connected to the PCI bus 51. Specifically, the I/O controller performs preset data processing on the picture data, comprised of still or moving pictures captured by the CCD camera 23, by the data processing unit 85, to input the resulting picture data to the graphics processing circuit 55.

The graphics processing circuit 55 memorizes the picture data supplied thereto in an enclosed VRAM (video random access memory) 55A and incidentally reads out the data to send the picture data so read out to the LCD controller 65 for storage in the hard disc drive 60 as necessary.

The LCD controller 65 controls a backlight 84 of the display unit 3 to illuminate the liquid crystal display 21 from its back side and to output picture data supplied from the graphics processing circuit 55 to the liquid crystal display 21 for display.

When the HTML browser 60B as read out from the hard disc drive 60 is booted on the RAM 54, the CPU 52 sends the HTML data by the HTML browser 60B to the graphics processing circuit 55.

When the HTML information processing program 60C, read out from the hard disc drive 60, is booted on the RAM 54, the CPU 52 also boots a digital map software, linked to the HTML information processing program 60C, and sends e.g., a map picture of an installation, prepared in accordance with the location information letter/character string, to the graphics processing circuit 55.

Based on the supplied HTML data, the graphics processing circuit 55 generates e.g., the picture data to be demonstrated on the liquid crystal display 21, and causes the so generated picture data to be stored in the VRAM 55A. The data so stored are read out incidentally therefrom so as to be sent to the LCD controller 65.

Thus, the LCD controller 65 is configured for demonstrating the HTML document, including e.g., map pictures, buried therein, on the liquid crystal display 21 of the display unit 3, based on the picture data supplied from the graphics processing circuit 55.

A PC card, not shown, is inserted in the PC card slot 13, connected to the PCI bus 51, when an optional function is to be added, so that data may be exchanged through the PC card between the PC card slot 13 and the CPU 52. For example, if a PCMCIA type GPS (Global Positioning System) card 57 is loaded in the PC card slot 13, the electrical wave from a GPS satellite may be received over a GPS antenna 58 connected to the GPS card 57 to acquire current position data.

In this manner, the GPS card 57 sends the current position data (latitude data, longitude data and altitude data) received over the GPS antenna 58 over the PCI bus 51 to the CPU 52.

The CPU 52 is designed so that, after sending the current position data to the graphics processing circuit 55 and causing the graphics processing circuit 55 to generate an arrow icon indicating the current position based on the current position data, the arrow mark icon so generated is displayed superimposed on the map picture of the liquid crystal display 21 through the LCD controller 65.

Thus, the liquid crystal display 21 is designed to display the route from the current position as detected by the GPS card 57 as far as the site corresponding to the aforementioned location information letter/character string. An arrow icon may also be displayed as it is moved on the map picture based on the location data.

A HTML information processing program 60C1 for this client 103 to operate in a similar manner to the first embodiment is now explained by referring to the flowchart of FIG. 3. This flowchart shows the processing flow which occurs as a consequence of execution of the HTML information processing program 60C1 by the CPU 52. This HTML information processing program 60C1 is stored in the HDD 60, as mentioned previously. In addition, this HTML information processing program 60C1 is linked to the booting of the HTML browser 60B stored in similar manner in the HDD 60.

First, at a time point that, as a consequence of a user operation, the read-in of the HTML document, displayed on the HTML browser 60B, has come to a close, the HTML browser 60B notifies the fact of end of the updating of the HTML document to the CPU 52 (step S1).

The CPU 52 then requests the HTML browser 60B to acquire the HTML document, for analyzing the location information letter/character in the HTML document, and acquires the HTML document which has been updated and which is being browsed (step S2).

The CPU 52 then commences the loop of analyzing the HTML document being browsed (step S3). This analysis loop is repeated for the totality of the letter/character strings in the HTML document, and is terminated at a step S10 which will be explained subsequently.

First, at step S4 of this analysis loop, a letter/character string, that is a location information letter/character string, which is seemingly the address or the telephone number, is taken out from the HTML document. This operation of extracting the location information letter/character string is carried out based on for example the technique disclosed in the aforementioned Japanese Laying-Open Patent Publication 2000-339309.

If it is determined at step S5 that the there is contained the letter/character string, that is the location information letter/character string, which is seemingly the address or the telephone number (YES), processing transfers to step S6. If it is determined that there is not contained the letter/character string (NO), processing transfers to step S10 to terminate the loop of HTML document analysis.

At step S6, the CPU 52 calculates, from the location information letter/character string, obtained from the HTML analysis processing, the latitude/longitude of the site in question, using the site information database provided in the HDD. When this latitude/longitude information has been calculated (YES at step S7), the CPU 52 proceeds to step S8. If the latitude/longitude cannot be calculated from the aforementioned location information letter/character string (NO at step S7), the HTML document analysis loop is terminated at step S10.

At step S8, the CPU 52 generates the map picture of the neighboring area of the location, based on the aforementioned latitude/longitude information, by referencing the map information database constructed in for example the HDD 60.

At step S9, the CPU 52 re-constructs the HTML, based on the generated map picture. That is, the CPU forms a new HTML document, comprised of the original HTML codes, acquired from the HTML browser 60B, and the aforementioned map picture, buried therein.

When the HTML document analysis loop from step S3 to step S10 has come to a close, the CPU 52 causes the HTML document to be displayed by the HTML browser 60B (step S11).

By the CPU 52 executing this HTML information processing program 60C1, the client 103 is able to execute the processing when the user has specified e.g., a home page of a restaurant on the HTML browser by inputting its URL, as shown in FIGS. 4 and 5.

First, if the user has entered on the HTML browser a URL reading: "http://restaurant○x.co.jp/011.html", the menu or the shop data, written in HTML, or the photo of cooking, is sent, after preset authentication connection processing, as the HTML document, from the specified Web server, and is transferred to the browser, for demonstration on the display screen.

If, at a time point when the HTML document, demonstrated on the HTML browser 201, has been read in, the HTML browser 60B notifies the end of updating of the HTML document to the CPU 52, the CPU 52 requests the HTML browser 60B to acquire the HTML document, in order to analyze the location information letter/character string in the HTML document, whereby the HTML document, which has been updated and which is being browsed, as show in FIG. 4, is acquired.

The CPU 52 initiates the analysis loop of the HTML document, being browsed, to extract the location information letter/character string which is seemingly the address or the telephone number. Here, since there is a letter/character string reading: "address: Shibuya-ku, △○○4-xx-5○○△ bldg., third floor" and "TEL: 03-9999-0000" in a column of "store data", as shown in FIG. 4, the CPU 52 extracts one or both of these letter/character strings.

From the location information letter/character string, thus extracted, the CPU 52 calculates the latitude/longitude of the location, using the site information database. The CPU also references the map information database, connected thereto, to generate a map picture of the area neighboring to the restaurant.

The CPU 52 then re-constructs the HTML, based on the map picture, to prepare new HTML comprised of the original HTML codes and the aforementioned map information buried therein.

Finally, the CPU 52 sends to the HTML browser 60B a display request for demonstrating the re-constructed new HTML document, and subsequently causes the new HTML document, including the map picture, buried therein, to be demonstrated on the display screen. This causes the map of the area neighboring to the restaurant to be demonstrated in the HTML document.

Thus, by the CPU executing the HTML information processing program 60B, the client is able to supply the map to the browsing party (user), if the address or the telephone number of the installation, such as restaurant, is stated, even though the scheme of displaying the map picture is not stated beforehand by the producer of the HTML document (information provider). Thus, the user feels it easier to grasp the geography.

An HTML information processing program 60C2 for this client 103 to operate as in the above-described second embodiment is now explained by referring to the flowchart of FIG. 7. This flowchart shows the processing flow for the results of execution of the HTML information processing program 60C2 by the CPU 52.

First, at a time point that, as a consequence of the user's operations, the read-in operation of the HTML document, demonstrated on the HTML browser 60B, has come to a close, the HTML browser 60B notifies the fact of completion of updating the HTML document to the CPU 52 (step S21).

The CPU 52 then acquires the HTML document, in order to analyze the location information letter/character string in the HTML document (step S22).

The CPU 52 then commences the analysis loop for the HTML document being browsed (step S23). This analysis loop is repeated for the totality of the letter strings contained in the HTML document, and comes to a close at the step S33 which will be explained subsequently.

In the course of the analysis loop, the letter/character string, which is seemingly the address or the telephone number, that is the location information letter/character string, is extracted at step S24 from the HTML document. This operation is carried out based on for example the technique disclosed in the aforementioned Japanese Laying-Open Patent Publication 2000-339309.

If it is determined at step S25 that there is contained the letter/character string, which is seemingly the address or the telephone number, that is the location information letter/character string (YES), processing transfers to step S26. If it is determined that there is not contained the location information letter/character string (NO), processing transfers to step S33 to terminate the loop of document analysis.

The CPU 52 at step S26 calculates the latitude/longitude of a site in question, from the location information letter/character string, obtained by the HTML analysis processing, using the site information database. If this latitude/longitude information has been calculated (YES at step S27), the CPU 52 proceeds to step S28. If the latitude/longitude cannot be calculated from the location information letter/character string (NO at step S27), the CPU proceeds to step S33 to terminate the HTML document analysis loop.

The CPU 52 at step S28 searches a route reaching the latitude/longitude information of the aforementioned location from the current site. If the route has been searched (YES at step S29), the CPU 52 proceeds to step S30. If the latitude/longitude cannot be calculated from the latitude/longitude (NO at step S29), the HTML document analysis loop is terminated at step S33.

The CPU 52 at step S30 receives the route information and references the map information database, connected thereto, to prepare a map picture encompassing the totality of the routes.

Then, at step S31, the CPU 52 generates a picture, which has synthesized the routes searched and the map picture, to re-construct the HTML document at step S32.

When the HTML document analysis loop has come to a close at step S33, the CPU 52 causes the HTML browser 201 to demonstrate the HTML document (step S34). In actuality, should this step follow the re-construction of the HTML document, carried out at step S32, the CPU 52 causes the re-constructed new HTML document to be demonstrated on the HTML browser.

Figure 8:
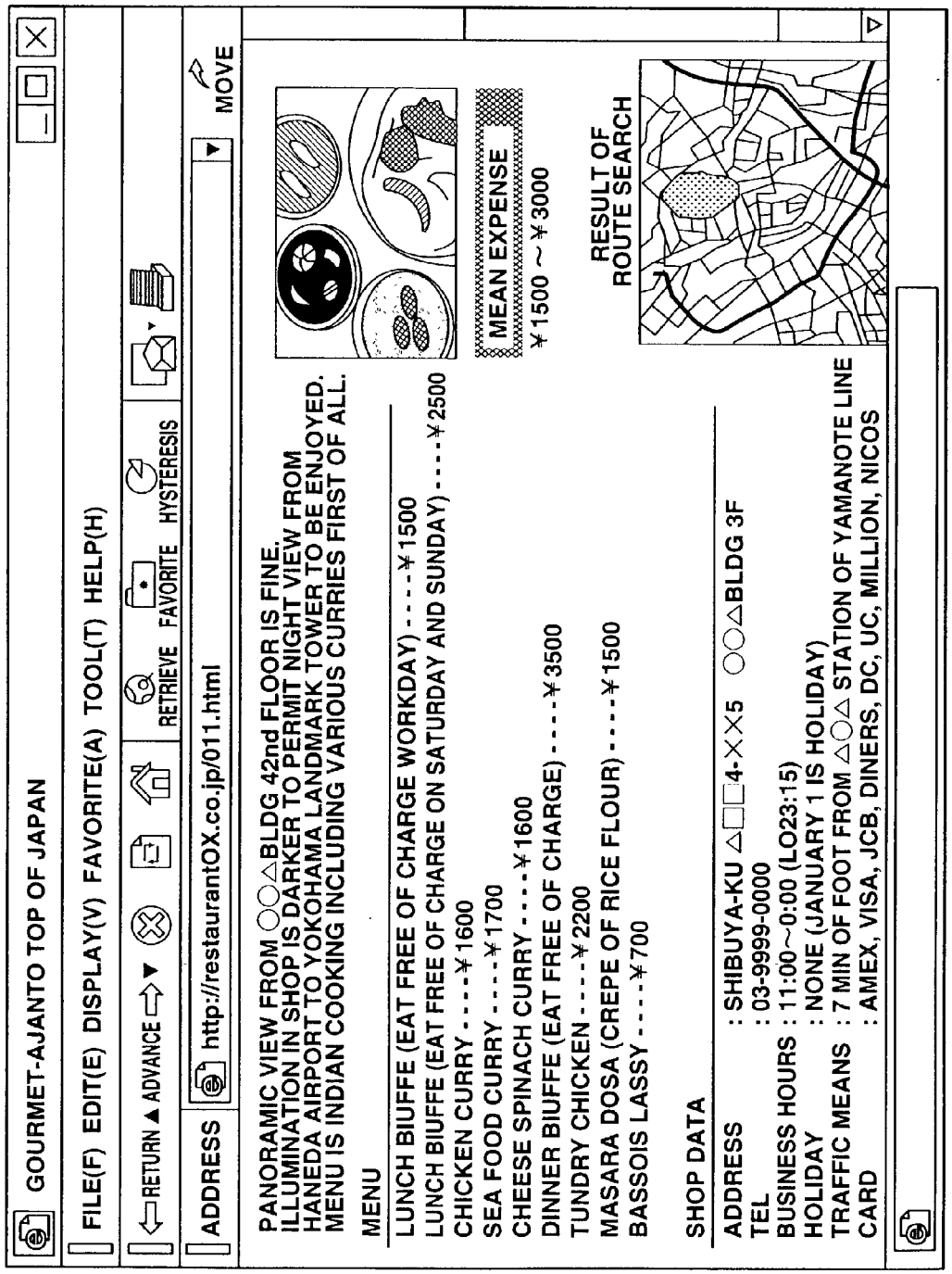
FIG. 8 illustrates the specified operation of the HTML information processing apparatus.

By the CPU 52 executing this HTML information processing program 60C2, the client is able to perform the processing for a case where the user has specified e.g., a home page of a restaurant, by inputting the corresponding URL on the HTML browser, as shown in FIGS. 4 and 8.

First, if the user has entered on the HTML browser a URL reading: "http://restaurant○x.co.jp/011.html", the menu or the shop data, written in HTML, or the photo of cooking, is sent, after preset authentication connection processing, as the HTML document, from the specified Web server, and is transferred to the browser, for demonstration on the display screen.

If, at a time point when the HTML document, demonstrated on the HTML browser 60B, has been read in, the HTML browser 60B has notified the end of updating of the HTML document to the CPU 52, the CPU requests the HTML browser 60B to acquire the HTML document, in order for the CPU to analyze the location information letter/character string in the HTML document, whereby the HTML document, which has been updated and which is being browsed, as show in FIG. 4, is acquired.

The CPU 52 initiates the analysis loop of the HTML document, being browsed, to extract the location information letter/character string, which is seemingly the address or the telephone number. Here, since there is a letter/character string reading: "address: Shibuya-ku, Δ○○4-xx-5○○Δ bldg., third floor" and "Tel: 03-9999-0000" in a column of "store data", as shown in FIG. 4, the HTML analyzer 211 extracts one or both of these letter/character strings.

From the location information letter/character string, thus extracted, the CPU 52 calculates the latitude/longitude of the site, using the site information database. The CPU 52 also references the route information database, connected thereto, to search a route from the current site to the latitude/longitude information.

The CPU 52 then references the map information database, connected thereto, to generate the map picture encompassing the totality of the aforementioned route information. The CPU 52 then re-constructs the HTML, based on the map picture, to form a new HTML comprised of the original HTML codes acquired from the HTML browser 60B and the aforementioned map information buried therein.

The CPU 52 then sends a display request for demonstrating the new re-constructed HTML document to the HTML browser 60B to cause the new HTML document, including the map picture buried therein, to be displayed on the display screen. This causes the map of the near-by area, including the totality of the routes from the current site to the restaurant, to be displayed in the HTML document, as shown in FIG. 8.

Thus, as the client 103 executes the HTML information processing program 60C2, a map encompassing the totality of routes to an installation of destination, associated with the user's current location, can be supplied to the browsing party (user), if the address or the telephone number of the installation, such as restaurant, is stated, even though the scheme of displaying the map picture is not stated beforehand by the producer of the HTML document (information provider). Thus, the user feels it easier to grasp the geography and may be guided in his or her movement to the installation of destination.

The present invention is not limited to the above-described embodiments. For example, the client side may operate without particular HTML browser or equipment by operation of a sort of a proxy server, instead of by operation of an equipment in which the HTML browser is operating.

Although the route information is formed in the second embodiment on synthesis on a map by route search processing, guiding may also be by the text information. For example, it is sufficient that the route information from the current site to a ○○ station to xx station to destination may be displayed at a lower or upper portion of the map of FIG. 5. This textual route information may be displayed in addition to the illustrative route display shown in FIG. 8.

In the portable information processing terminal (PDA), the information processing programs 60C1 and 60C2 may also be fetched from an enclosed ROM or from a removable semiconductor memory, on booting the HTML browser, so as to be executed by the enclosed CPU and so as to be linked with the digital picture processing program, thereby causing the HTML document of FIGS. 4 to 5 or 8 to be displayed in the HTML document in accordance with the flowchart shown in FIGS. 3 and 7.

What is claimed is:

1. An information processing method in which a text document of a preset form, arranged in a descriptive language, capable of burying at least picture information in the document, is displayed on a screen to permit a user to take out desired information therefrom, said method comprising:

a location information letter/character string extracting step of automatically extracting a location information letter/character string in the text document of the preset form as displayed on said screen;

a site search step of searching a site indicated by said location information letter/character string extracted at said location information letter/character string extracting step for generating latitude/longitude information of said site;

a map picture generating step of generating a map picture around the latitude/longitude information generated at said site search step;

a text document correcting step of correcting the text document of the preset form for synthetically displaying the map picture generated at said map picture generating step in said text document of the preset form displayed on said screen; and a step of newly displaying the text document of the preset form as corrected at said text document correcting step on said screen.

2. A program tangibly embodied on a computer-readable medium in which a text document of a preset form, arranged in a descriptive language, capable of burying at least the picture information in the document, is displayed on a screen of an information processing apparatus to permit a user to take out desired information therefrom, said program comprising:
- a location information letter/character string extracting step of automatically extracting a location information letter/character string in the text document of the preset form as displayed on said screen;
- a site search step of searching a site indicated by said location information letter/character string extracted at said location information letter/character string extracting step for generating the latitude/longitude information of said site;
- a map picture generating step of generating a map picture around the latitude/longitude information generated at said site search step;
- a text document correcting step of correcting the text document of the preset form for synthetically displaying the map picture generated at said map picture generating step in said text document of the preset form displayed on said screen; and
- a step of newly displaying the text document of the preset form as corrected at said text document correcting step on said screen.

3. An information processing method in which a text document of a preset form, arranged in a descriptive language, capable of burying at least picture information in the document, is demonstrated on screen to permit a user to take out desired information therefrom, said apparatus comprising:
- a location information letter/character string extracting means for automatically extracting a location information letter/character string in the text document of the preset form as displayed on said screen;
- a site search step of searching a site indicated by said location information letter/character string extracted by said location information letter/character string extracting means for generating latitude/longitude information of said site;
- a map picture generating step of generating a map picture around the latitude/longitude information generated by said site search means; and
- a text document correcting step of correcting the text document of the preset form for synthetically displaying the map picture generated at said map picture generating step in said text document of the preset form displayed on said screen;
- wherein the text document of the preset form as corrected by said text document correcting means is newly displayed on said screen.

4. The information processing apparatus according to claim 1 wherein the text document of the preset form, written in said descriptive language, is sent from an information supplying apparatus over a network.

5. The information processing apparatus according lo claim 4 wherein a browser for downloading said text document of the preset form from said information supplying apparatus over said network to meet the operator's intention is booted.

6. The information processing apparatus according to claim 4 wherein said descriptive language is the HTML (Hypertext Markup Language) and wherein said text document of the preset form is an HTML document.

7. An information processing method in which a text document of a preset form, arranged in a descriptive language, capable of burying at least picture information in the document, is demonstrated on a screen to permit a user to take out desired information, said method comprising:
- a location information letter/character string extracting step of automatically extracting a location information letter/character string in the text document of the preset form as displayed on said screen;
- a site searching step of searching a site indicated by said location information letter/character string extracted by said location information letter/character string extracting step for generating latitude/longitude information for said site;
- a route searching step of searching a route reaching the latitude/longitude information of the site generated by said site searching step from a current site;
- a map picture generating step of generating a map picture including a totality of routes output by said route searching step;
- a text document correcting step of correcting the text document of the preset form for synthetically displaying the map picture generated at said map picture generating step in said text document of the preset form displayed on said screen; and
- a display step of newly displaying the text document of the preset form as corrected by said text document correcting step on said screen.

8. A program tangibly embodied on a computer-readable medium in which a text document of a preset form, arranged in a descriptive language, capable of burying at least picture information in the document, is demonstrated on a screen to permit a user to take out desired information, said method comprising:
- a location information letter/character string extracting step of automatically extracting a location information letter/character string in the text document of the preset form as displayed on said screen;
- a site searching step of searching a site indicated by said location information letter/character string extracted by said location information letter/character string extracting step for generating latitude/longitude information for said site;
- a route searching step of searching a route reaching the latitude/longitude information of the site generated by said site searching step from a current site;
- a map picture generating step of generating a map picture including a totality of routes output by said route searching step;
- a text document correcting step of correcting the text document of the preset form for synthetically displaying the map picture generated at said map picture generating step in said text document of the preset form displayed on said screen; and
- a display step of newly displaying the text document of the preset form as corrected by said text document correcting step on said screen.

9. An information processing apparatus in which a text document of a preset form, arranged in a descriptive language, capable of burying at least picture information in the document, is demonstrated on a screen to permit a user to take out desired information therefrom, said apparatus comprising:
- location information letter/character string extracting means for automatically extracting a location information letter/character string in the text document of the preset form as displayed on said screen;
- site searching means for searching a site indicated by said location information letter/character string extracted by said location information letter/character string extracting means for generating latitude/longitude information for said site;

route searching means for searching a route reaching the latitude/longitude information of the site generated by said site searching means from a current site;

map picture generating means for generating a map picture including a totality of routes output by said route searching means; and text document correcting means for correcting the text document of the preset form for synthetically displaying the map picture generated by said map picture generating means in said text document of the preset form displayed on said screen;

wherein the text document of the preset form as corrected by said text document correcting means is newly displayed on said screen.

10. The information processing apparatus according to claim 9 wherein the text document of the preset form, written in said descriptive language, is sent from an information supplying apparatus over a network.

11. The information processing apparatus according to claim 10 wherein a browser for downloading said text document of the preset form from said information supplying apparatus over said network to meet the operator's intension is booted.

12. The information processing apparatus according to claim 10 wherein said descriptive language is the HTML (Hypertext markup language) and wherein said text document of the preset form is an HTML document.

* * * * *